(12) United States Patent
Xiao et al.

(10) Patent No.: US 11,367,165 B2
(45) Date of Patent: Jun. 21, 2022

(54) NEURAL SUPER-SAMPLING FOR REAL-TIME RENDERING

(71) Applicant: Facebook Technologies, LLC, Menlo Park, CA (US)

(72) Inventors: Lei Xiao, Redmond, WA (US); Salah Eddine Nouri, Bellevue, WA (US); Douglas Robert Lanman, Bellevue, WA (US); Anton S Kaplanyan, Redmond, WA (US); Alexander Jobe Fix, Seattle, WA (US); Matthew Steven Chapman, Redmond, WA (US)

(73) Assignee: Facebook Technologies, LLC., Menlo Park, CA (US)

( * ) Notice: Subject to any disclaimer, the term of this patent is extended or adjusted under 35 U.S.C. 154(b) by 0 days.

(21) Appl. No.: 17/039,263

(22) Filed: Sep. 30, 2020

(65) Prior Publication Data
US 2021/0366082 A1    Nov. 25, 2021

Related U.S. Application Data

(60) Provisional application No. 63/027,258, filed on May 19, 2020.

(51) Int. Cl.
*G06T 3/40*     (2006.01)
*G06T 11/00*    (2006.01)
(Continued)

(52) U.S. Cl.
CPC .......... *G06T 3/4053* (2013.01); *G06T 3/0093* (2013.01); *G06T 3/4046* (2013.01);
(Continued)

(58) Field of Classification Search
None
See application file for complete search history.

(56) References Cited

U.S. PATENT DOCUMENTS

| 2012/0294369 A1* | 11/2012 | Bhagavathy | ........... H04N 19/12 |
|---|---|---|---|
| | | | 375/240.16 |
| 2017/0230675 A1* | 8/2017 | Wierstra | ................. G06N 3/08 |

(Continued)

OTHER PUBLICATIONS

R. Kalarot and F. Porikli, "MultiBoot Vsr: Multi-Stage Multi-Reference Bootstrapping for Video Super-Resolution," 2019 IEEE/CVF Conference on Computer Vision and Pattern Recognition Workshops (CVPRW), 2019, pp. 2060-2069, doi: 10.1109/CVPRW.2019.00258. (Year: 2019).*

(Continued)

*Primary Examiner* — James A Thompson
(74) *Attorney, Agent, or Firm* — Baker Botts L.L.P.

(57) ABSTRACT

In one embodiment, a method includes receiving a first frame associated with a first time and one or more second frames of a video having a resolution lower than a target resolution, wherein each second frame is associated with a second time prior to the first time, generating a first feature map for the first frame and one or more second feature maps for the one or more second frames, up-sampling the first feature map and the one or more second feature maps to the target resolution, warping each of the up-sampled second feature maps according to a motion estimation between the associated second time and the first time, and generating a reconstructed frame having the target resolution corresponding to the first frame by using a machine-learning model to process the up-sampled first feature map and the one or more up-sampled and warped second feature maps.

20 Claims, 14 Drawing Sheets
(10 of 14 Drawing Sheet(s) Filed in Color)

(51) Int. Cl.
*G06T 7/285* (2017.01)
*H04N 13/366* (2018.01)
*G06T 7/246* (2017.01)
*G06T 3/00* (2006.01)

(52) U.S. Cl.
CPC .............. *G06T 7/246* (2017.01); *G06T 7/285* (2017.01); *G06T 11/00* (2013.01); *H04N 13/366* (2018.05); *G06T 2207/10021* (2013.01); *G06T 2210/36* (2013.01)

(56) References Cited

U.S. PATENT DOCUMENTS

| | | | |
|---|---|---|---|
| 2019/0098332 A1* | 3/2019 | Fu | H04N 19/70 |
| 2019/0243131 A1* | 8/2019 | Yi | G02B 27/0172 |
| 2020/0126191 A1* | 4/2020 | Munkberg | G06T 5/50 |
| 2021/0067801 A1* | 3/2021 | Schroers | G06K 9/6217 |
| 2021/0383169 A1* | 12/2021 | Wang | G06K 9/6262 |

OTHER PUBLICATIONS

Abadi, Martin, Ashish Agarwal, Paul Barham, Eugene Brevdo, Zhifeng Chen, Craig Citro, Greg S. Corrado et al. "Tensorflow: Large-scale machine learning on heterogeneous distributed systems." *arXiv preprint arXiv*: 1603.04467, Mar. 14, 2016.

Akeley, Kurt. "Reality engine graphics." In *Proceedings of the 20th annual conference on Computer graphics and interactive techniques*, pp. 109-116, Sep. 1, 1993.

Chakravarty R. Alla Chaitanya, Anton S. Kaplanyan, Christoph Schied, Marco Salvi, Aaron Lefohn, Derek Nowrouzezahrai, and Timo Aila. 2017. Interactive reconstruction of Monte Carlo image sequences using a recurrent denoising autoencoder. *ACM Transactions on Graphics (Proceedings of SIGGRAPH)* 36, 4 (2017), 98:1-98:12, Jul. 20, 2017.

Mengyu Chu, You Xie, Laura Leal-Taixé, and Nils Thuerey. 2018. Temporally coherent gans for video super-resolution (tecogan). *arXiv preprint arXiv*: 1811.09393 (Nov. 23, 2018).

Chao Dong, Chen Change Loy, Kaiming He, and Xiaoou Tang. 2015. Image super-resolution using deep convolutional networks. *IEEE Transactions on Pattern Analysis and Machine Intelligence* 38, 2 (2015), 295-307, Jul. 31, 2015.

Andrew Edelsten, Paula Jukarainen, and Anjul Patney. 2019. Truly next-gen: Adding deep learning to games and graphics. In *NVIDIA Sponsored Sessions (Game Developers Conference)*. https://www.gdcvault.com/play/1026184/Truly-Next-Gen-Adding-Deep, Mar. 18, 2019.

Epic Games. 2020. Unreal engine. https://www.unrealengine.com, Downloaded from web Dec. 14, 2020.

Weifeng Ge, Bingchen Gong, and Yizhou Yu. 2018. Image super-resolution via deterministic-stochastic synthesis and local statistical rectification. In *SIGGRAPH Asia 2018 Technical Papers*. ACM, 260, Sep. 18, 2018.

Glorot, Xavier, and Yoshua Bengio. "Understanding the difficulty of training deep feedforward neural networks." In *Proceedings of the thirteenth international conference on artificial intelligence and statistics*, pp. 249-256, Mar. 21, 2010.

Haris, Muhammad, Gregory Shakhnarovich, and Norimichi Ukita. "Recurrent back-projection network for video super-resolution." In *Proceedings of the IEEE Conference on Computer Vision and Pattern Recognition*, pp. 3897-3906. 2019.

Hasinoff, Samuel W., Dillon Sharlet, Ryan Geiss, Andrew Adams, Jonathan T. Barron, Florian Kainz, Jiawen Chen, and Marc Levoy. "Burst photography for high dynamic range and low-light imaging on mobile cameras." *ACM Transactions on Graphics (TOG)* 35, No. 6 (2016): 1-12, Nov. 11, 2016.

He, Kaiming, Xiangyu Zhang, Shaoqing Ren, and Jian Sun. "Deep residual learning for image recognition." In *Proceedings of the IEEE conference on computer vision and pattern recognition*, pp. 770-778. 2016.

Huang, Gao, Zhuang Liu, Laurens Van Der Maaten, and Kilian Q. Weinberger. "Densely connected convolutional networks." In *Proceedings of the IEEE conference on computer vision and pattern recognition*, pp. 4700-4708, Jan. 28, 2018.

Jimenez, Jorge, Jose I. Echevarria, Tiago Sousa, and Diego Gutierrez. "SMAA: enhanced subpixel morphological antialiasing." In *Computer Graphics Forum*, vol. 31, No. 2pt1, pp. 355-364. Oxford, UK: Blackwell Publishing Ltd, 2012.

Jo, Younghyun, Seoung Wug Oh, Jaeyeon Kang, and Seon Joo Kim. "Deep video super-resolution network using dynamic upsampling filters without explicit motion compensation." In *Proceedings of the IEEE conference on computer vision and pattern recognition*, pp. 3224-3232. 2018.

Johnson, Justin, Alexandre Alahi, and Li Fei-Fei. "Perceptual losses for real-time style transfer and super-resolution." In *European conference on computer vision*, pp. 694-711. Springer, Cham, Oct. 8, 2016.

Kaplanyan, Anton S., Stephan Hill, Anjul Patney, and Aaron E. Lefohn, "Filtering distributions of normals for shading antialiasing." In *High Performance Graphics*, pp. 151-162, Jun. 20, 2016.

Kaplanyan, Anton S., Anton Sochenov, Thomas Leimkühler, Mikhail Okunev, Todd Goodall, and Gizem Rufo. "DeepFovea: Neural reconstruction for foveated rendering and video compression using learned statistics of natural videos." *ACM Transactions on Graphics (TOG)* 38, No. 6 (2019): 1-13, Nov. 8, 2019.

Karis, B. "High quality temporal anti-aliasing." *Advances in Real-Time Rendering for Games, SIGGRAPH Courses* (Aug. 11, 2014).

Kim, Jiwon, Jung Kwon Lee, and Kyoung Mu Lee. "Accurate image super-resolution using very deep convolutional networks." In *Proceedings of the IEEE conference on computer vision and pattern recognition*, pp. 1646-1654. 2016.

Kingma, Diederik P., and Jimmy Ba. "Adam: A method for stochastic optimization." *arXiv preprint arXiv*: 1412.6980 (Dec. 22, 2014).

Lai, Wei-Sheng, Jia-Bin Huang, Narendra Ahuja, and Ming-Hsuan Yang. "Deep laplacian pyramid networks for fast and accurate super-resolution." In *Proceedings of the IEEE conference on computer vision and pattern recognition*, pp. 624-632. 2017.

Ni, Xingyu, Bo Zhu, Bin Wang, and Baoquan Chen. "A level-set method for magnetic substance simulation." *ACM Transactions on Graphics (TOG)* 39, No. 4 (2020): 29-1, Jul. 2020.

Ledig, Christian, Lucas Theis, Ferenc Huszár, Jose Caballero, Andrew Cunningham, Alejandro Acosta, Andrew Aitken et al. "Photo-realistic single image super-resolution using a generative adversarial network." In *Proceedings of the IEEE conference on computer vision and pattern recognition*, pp. 4681-4690. 2017.

Lim, Bee, Sanghyun Son, Heewon Kim, Seungjun Nah, and Kyoung Mu Lee. "Enhanced deep residual networks for single image super-resolution." In *Proceedings of the IEEE conference on computer vision and pattern recognition workshops*, pp. 136-144. 2017.

Lottes, Timothy. FXAA. White Paper Technical Report. NVIDIA Corp. 3 pages, Feb. 2009.

Microsoft. 2019. Directx variable rate shading. https://microsoft.github.io/DirectX-Specs/d3d/VariableRateShading.html, Downloaded from web Jan. 4, 2021.

Mildenhall, Ben, Pratul P. Srinivasan, Rodrigo Ortiz-Cayon, Nima Khademi Kalantari, Ravi Ramamoorthi, Ren Ng, and Abhishek Kar. "Local light field fusion: Practical view synthesis with prescriptive sampling guidelines." *ACM Transactions on Graphics (TOG)* 38, No. 4 (2019): 1-14, Jul. 12, 2019.

Nvidia Corporation. 2017-2018. TensorRT. https://developer.nvidia.com/tensorrt. Anjul Patney, Marco Salvi, Joohwan Kim, Anton Kaplanyan, Chris Wyman, Nir Benty, 2017-2018.

Patney Anjul, Marco Salvi, Joohwan Kim, Anton Kaplanyan, Chris Wyman, Nir Benty, David Luebke, an Aaron Lefohn. "Towards foveated rendering for gaze-tracked virtual reality." *ACM Transactions on Graphics (TOG)* 35, No. 6 (2016): 179, Nov. 11, 2016.

Reeves, William T., David H. Salesin, and Robeit L. Cook. "Rendering antialiased shadows with depth maps." In *Proceedings of the 14th annual conference on Computer graphics and interactive techniques*, pp. 283-291, Aug. 1, 1987.

(56) References Cited

OTHER PUBLICATIONS

Reshetov, Alexander. "Morphological antialiasing." In *Proceedings of the Conference on High Performance Graphics 2009*, pp. 109-116, Aug. 1, 2009.

Sajjadi Mehdi SM, Raviteja Vemulapalli, and Matthew Brown. "Frame-recurrent video super-resolution." In *Proceedings of the IEEE Conference on Computer Vision and Pattern Recognition*, pp. 6626-6634. 2018.

Schied, Christoph, Anton Kaplanyan, Chris Wyman, Anjul Patney, Chakravarty R. Alla Chaitanya, John Burgess, Shiqiu Liu, Carsten Dachsbacher, Aaron Lefohn, and Marco Salvi. "Spatiotemporal variance-guided filtering: real-time reconstruction for path-traced global illumination." In *Proceedings of High Performance Graphics*, pp. 1-12, Jul. 28, 2017.

Shi, Wenzhe, Jose Caballero, Ferenc Huszár, Johannes Totz, Andrew P. Aitken, Rob Bishop, Daniel Rueckert, and Zehan Wang. "Real-time single image and video super-resolution using an efficient sub-pixel convolutional neural network," in *Proceedings of the IEEE conference on computer vision and pattern recognition*, pp. 1874-1883, 2016.

Soundararajan, Rajiv, and Alan C. Bovik. "Video quality assessment by reduced reference spatio-temporal entropic differencing." *IEEE Transactions on Circuits and Systems for Video Technology* 23, No. 4 (2012): 684-694, Aug. 22, 2012.

Tao, Xin, Hongyun Gao, Renjie Liao, Jue Waiig, and Jiaya Jia. "Detail-revealing deep video super-resolution." In *Proceedings of the IEEE International Conference on Computer Vision*, pp. 4472-4480, 2017.

Unity Technologies. 2005-2020. Unity engine. http://unity3d.com, Downloaded from web Jan. 5, 2021.

Wang, Xintao, Kelvin CK Chan, Ke Yu, Chao Dong, and Chen Change Loy. "Edvr: Video restoration with enhanced deformable convolutional networks." In *Proceedings of the IEEE Conference on Computer Vision and Pattern Recognition Workshops*, pp. 0-0. 2019.

Wang, Zhou, Alan C. Bovik, Hamid R. Sheikh, and Eero P. Simoncelli. "Image quality assessment: from error visibility to structural similarity." *IEEE transactions on image processing* 13, No. 4 (2004): 600-612, Apr. 13, 2004.

Williams, Lance. "Pyramidal parametrics." In *Proceedings of the 10th annual conference on Computer graphics and interactive techniques*, pp. 1-11, Jul. 1, 1983.

Wronski, Bartlomiej, Ignacio Garcia-Dorado, Manfred Ernst, Damien Kelly, Michael Krainin, Chia-Kai Liang, Marc Levoy, and Peyman Milanfar. "Handheld multi-frame super-resolution." *ACM Transactions on Graphics (TOG)* 38, No. 4 (2019): 1-18, Jul. 12, 2019.

Yang, Lei, Diego Nehab, Pedro V. Sander, Pitchaya Sitthi-amorn, Jason Lawrence, and Hugues Hoppe. "Amortized supersampling." *ACM Transactions on Graphics (TOG)* 28, No. 5 (2009): 1-12, Dec. 1, 2009.

Yang, Wenming, Xuechen Zhang, Yapeng Tian, Wei Wang, Jing-Hao Xue, and Qingmin Liao. "Deep learning for single image super-resolution: A brief review." *IEEE Transactions on Multimedia* 21, No. 12 (2019): 3106-3121, May 28, 2019.

Zhang, Yulun, Kunpeng Li, Kai Li, Lichen Wang, Bineng Zhong, and Yun Fu. "Image super-resolution using very deep residual channel attention networks." In *Proceedings of the European Conference on Computer Vision (ECCV)*. pp, 286-301, 2018.

Zhang, Yulun, Yapeng Tian, Yu Kong, Bineng Zhong, and Yun Fu. "Residual dense network for image super-resolution." In *Proceedings of the IEEE conference on computer vision and pattern recognition*, pp. 2472-2481. 2018.

Hayat K., et al., "Multimedia Super-Resolution via Deep Learning: A Survey," Digital Signal Processing. Academic Press, vol. 81, Jul. 26, 2018, pp. 198-217.

International Search Report and Written Opinion for International Application No. PCT/US2021/033004 dated Aug. 31, 2021, 16 pages.

Kapse K., "An Overview of Current Deep Learned Rendering Technologies," 7th International Conference Onadvanced Computing and Communicationsystems (ICACCS). IEEE, vol. 1, Mar. 19, 2021, pp. 1404-1409.

Xiao L. et al., "Introducing neural Supersampling for Real-Time Rendering," Jul. 2020, retrieved from the Internet: https://web.archive.org/web/20200701211620/https://research.fb.com/blog/2020/07/introducing-neural-supersampling-for-realtime-rendering/ on Aug. 18, 2021, 8 pages.

Xiao L. et al., "Neural Supersampling for Real-time Rendering," ACM Trans. Graph., vol. 39, No. 4, Jul. 8, 2020, pp. 142:1-142:12.

\* cited by examiner

NEURAL SUPER-SAMPLING FOR REAL-TIME RENDERING

PRIORITY

This application claims the benefit under 35 U.S.C. § 119(e) of U.S. Provisional Patent Application No. 63/027,258, filed 19 May 2020, which is incorporated herein by reference.

TECHNICAL FIELD

This disclosure generally relates to graphic rendering, and in particular relates to graphic rendering for graphics applications.

BACKGROUND

Virtual reality (VR) is a simulated experience that can be similar to or completely different from the real world. Applications of virtual reality can include entertainment (i.e. video games) and educational purposes (i.e. medical or military training). Other, distinct types of VR style technology include augmented reality and mixed reality. Currently standard virtual reality systems use either virtual reality headsets or multi-projected environments to generate realistic images, sounds and other sensations that simulate a user's physical presence in a virtual environment. A person using virtual reality equipment is able to look around the artificial world, move around in it, and interact with virtual features or items. The effect is commonly created by VR headsets consisting of a head-mounted display with a small screen in front of the eyes, but can also be created through specially designed rooms with multiple large screens. Virtual reality typically incorporates auditory and video feedback, but may also allow other types of sensory and force feedback through haptic technology.

Augmented reality (AR) is an interactive experience of a real-world environment where the objects that reside in the real world are enhanced by computer-generated perceptual information, sometimes across multiple sensory modalities, including visual, auditory, haptic, somatosensory and olfactory. AR can be defined as a system that fulfills three basic features: a combination of real and virtual worlds, real-time interaction, and accurate 3D registration of virtual and real objects. The overlaid sensory information can be constructive (i.e. additive to the natural environment), or destructive (i.e. masking of the natural environment). This experience is seamlessly interwoven with the physical world such that it is perceived as an immersive aspect of the real environment. In this way, augmented reality alters one's ongoing perception of a real-world environment, whereas virtual reality completely replaces the user's real-world environment with a simulated one.

SUMMARY OF PARTICULAR EMBODIMENTS

Due to higher resolutions and refresh rates, as well as more photorealistic effects, real-time rendering has become increasingly challenging for video games, emerging virtual/augmented reality headsets, and other graphics applications. To meet this demand, modern graphics hardware and game engines often reduce the computational cost by rendering at a lower resolution and then up-sampling to the native resolution. Following the recent advances in image and video super-resolution in computer vision, the embodiments disclosed herein propose a machine learning approach that is specifically tailored for high-quality up-sampling of rendered content in real-time applications including video games, virtual reality, augmented reality, mixed reality, or any suitable graphics applications. One insight of the embodiments disclosed herein may be that in rendered content, the image pixels are point-sampled, but precise temporal dynamics is available. The embodiments disclosed combine this specific information that is typically available in modern renderers (i.e., depth and dense motion vectors) with a novel temporal network design that takes into account such specifics and is aimed at maximizing video quality while delivering real-time performance. By training on a large synthetic dataset rendered from multiple 3D scenes with recorded camera motion, the embodiments disclosed demonstrate high fidelity and temporally stable results in real time, even in the highly challenging 4×4 up-sampling scenario, significantly outperforming existing super-resolution and temporal antialiasing work.

In particular embodiments, a computing system may receive a first frame and one or more second frames of a video having a resolution lower than a target resolution. The first frame may be associated with a first time and each second frame may be associated with a second time prior to the first time. The computing system may generate a first feature map for the first frame and one or more second feature maps for the one or more second frames. In particular embodiments, the computing system may then up-sample the first feature map and the one or more second feature maps to the target resolution. The computing system may warp each of the one or more up-sampled second feature maps according to a motion estimation between the associated second time and the first time. The computing system may further generate a reconstructed frame corresponding to the first frame by using a machine-learning model to process the up-sampled first feature map and the one or more up-sampled and warped second feature maps, the reconstructed frame having the target resolution.

Embodiments of the invention may include or be implemented in conjunction with an artificial reality system. Artificial reality is a form of reality that has been adjusted in some manner before presentation to a user, which may include, e.g., a virtual reality (VR), an augmented-reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF EXAMPLE EMBODIMENTS

Due to higher resolutions and refresh rates, as well as more photorealistic effects, real-time rendering has become increasingly challenging for video games, emerging virtual/augmented reality headsets, and other graphics applications. To meet this demand, modern graphics hardware and game engines often reduce the computational cost by rendering at a lower resolution and then up-sampling to the native resolution. Following the recent advances in image and video super-resolution in computer vision, the embodiments disclosed herein propose a machine learning approach that is specifically tailored for high-quality up-sampling of rendered content in real-time applications including video games, virtual reality, augmented reality, mixed reality, or any suitable graphics applications. One insight of the embodiments disclosed herein may be that in rendered content, the image pixels are point-sampled, but precise temporal dynamics is available. The embodiments disclosed combine this specific information that is typically available in modern renderers (i.e., depth and dense motion vectors) with a novel temporal network design that takes into account such specifics and is aimed at maximizing video quality while delivering real-time performance. By training on a large synthetic dataset rendered from multiple 3D scenes with recorded camera motion, the embodiments disclosed demonstrate high fidelity and temporally stable results in real time, even in the highly challenging 4×4 up-sampling scenario, significantly outperforming existing super-resolution and temporal antialiasing work.

In particular embodiments, a computing system may receive a first frame and one or more second frames of a video having a resolution lower than a target resolution. The first frame may be associated with a first time and each second frame may be associated with a second time prior to the first time. The computing system may generate a first feature map for the first frame and one or more second feature maps for the one or more second frames. In particular embodiments, the computing system may then up-sample the first feature map and the one or more second feature maps to the target resolution. The computing system may warp each of the one or more up-sampled second feature maps according to a motion estimation between the associated second time and the first time. The computing system may further generate a reconstructed frame corresponding to the first frame by using a machine-learning model to process the up-sampled first feature map and the one or more up-sampled and warped second feature maps, the reconstructed frame having the target resolution.

Figure 1:
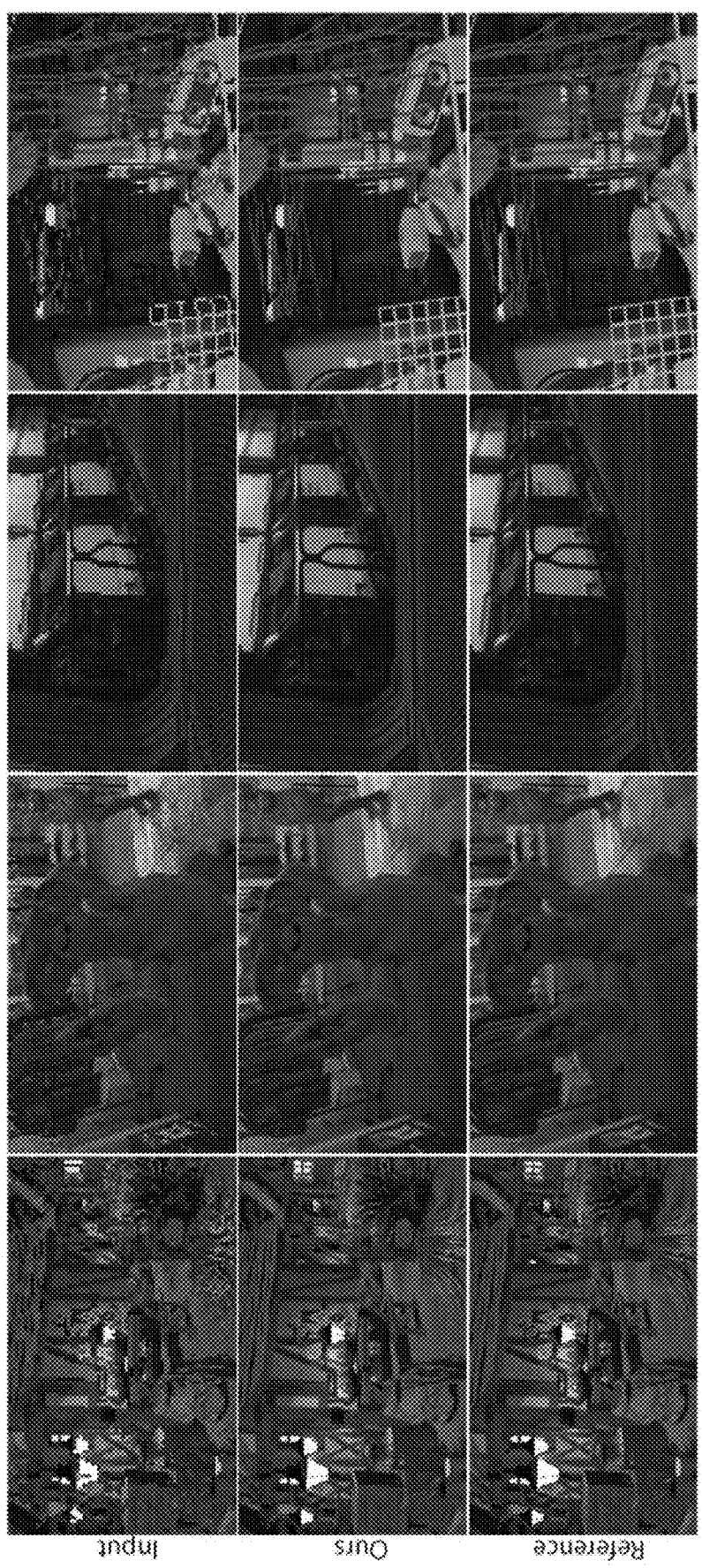
FIG. 1 illustrates example results of our real-time, learned 4×4 super-sampling for four sample scenes.

FIG. 1 illustrates example results of our real-time, learned 4×4 super-sampling for four sample scenes. From top to bottom: the rendered low-resolution color input, our reconstruction, and the rendered reference images. Our super-sampling method may take the color, depth, and motion vectors of multiple low-resolution frames, and produce high-fidelity reconstructions by reducing aliasing and recovering scene details.

Real-time rendering for modern desktop, mobile, virtual reality, augmented reality applications, or any suitable graphics application may be challenging due to increasing display resolutions and demands for photorealistic visual quality. As an example and not by way of limitation, a virtual reality (VR) headset or an augmented reality (AR) headset may require rendering 2880×1600 pixels at 90-144 Hz and recent gaming monitors may support 3840×2160 resolution at 144 Hz, which, together with the recent advances in physically based shading and real-time ray tracing, may set a high demand on computational power for high-quality rendering.

A multitude of techniques have been introduced to address this problem in recent years. One technique applies fixed foveated rendering, for which peripheral regions are rendered at low resolution. Another technique employs gaze-contingent foveated reconstruction by rendering non-uniform sparse pixel samples followed by neural reconstruction. Another technique introduces the temporal antialiasing upscaling (TAAU) method which utilizes pixel color statistics and temporal accumulation for super-sampling. Variable rate shading has been introduced recently to accelerate rendering by reducing the shading complexity for foveated and high-resolution displays. Another technique has recently released deep-learned super-sampling (DLSS) that up-samples low-resolution rendered content with a neural network in real-time. However, these methods either introduce obvious visual artifacts into the up-sampled images, especially at up-sampling ratios higher than 2×2, or rely on proprietary technologies and/or hardware that may be unavailable on all platforms.

The embodiments disclosed herein introduce a method that may be easy to integrate with modern game engines, require no special hardware (e.g., eye tracking) or software (e.g., proprietary drivers for DLSS), making it applicable to a wider variety of existing software platforms, acceleration hardware and displays. In particular embodiments, a computing system may take common inputs from modern game engines, i.e., color, depth and motion vectors at a lower resolution, and significantly up-sample the input imagery to the target high resolution using a temporal convolutional neural network. Different than most existing real-time super-sampling methods, which typically aim for no more than 2×2 up-sampling in practice, the embodiments disclosed herein may allow for compelling 4×4 up-sampling from highly aliased input and produce high fidelity and temporally stable results in real-time.

While prominent advances have been demonstrated for photographic image and video up-sampling with deep learning techniques, these methods may not apply to rendered content. The fundamental difference in image formation between rendered and photographic images may be that each sample in the rendering is a point sample in both space and time, in contrast to a pixel area integral in photographic images. Therefore, the rendered content may be highly aliased, especially at a low resolution. This may make up-sampling for rendered content both an antialiasing and interpolation problem, rather than the deblurring problem as studied in existing super-resolution work in computer vision community. On the other hand, pixel samples in real-time rendering may be accurate, and more importantly, motion vectors (i.e. geometric correspondences between pixels in sequential frames) may be available nearly for free at subpixel precision. These inputs may bring both new benefits and challenges into the super-resolution problem for rendering, which motivates the embodiments disclosed herein to revisit the deep learning techniques for rendering.

Large datasets may be necessary for training robust networks. To train for temporal stability, the datasets should also represent realistic camera motions (e.g., with large rotation and translation). The embodiments disclosed herein found that no existing datasets may satisfy our requirements. Therefore, the embodiments disclosed herein build a large-scale dataset generation pipeline in Unity (i.e., a cross-platform game engine), replay head motion captured from VR user studies, and render color, depth and motion vectors for thousands of frames for each of our representative dynamic scenes. This new dataset may enable us to train and test neural networks on realistic use cases, including the disclosed architecture herein and existing learned super-resolution methods. With such comparisons, the embodiments disclosed herein demonstrate that our network significantly outperforms prior state-of-the-art learned super-resolution and temporal antialiasing upscaling work.

The technical contributions of the embodiments disclosed herein may be summarized as follows.

The embodiments disclosed herein introduce a temporal neural network tailored for image super-sampling of rendered content that employs rich rendering attributes (i.e., color, depth, and motion vectors) and that is optimized for real-time applications including video games, virtual reality, augmented reality, mixed reality, or any suitable graphics applications.

The embodiments disclosed herein demonstrate the first learned super-sampling method that achieves significant 4×4 super-sampling with high spatial and temporal fidelity.

The embodiments disclosed herein significantly outperform prior work, including real-time temporal antialiasing upscaling and state-of-the-art image and video super-resolution methods, both in terms of visual fidelity and quantitative metrics of image quality.

Figure 2:
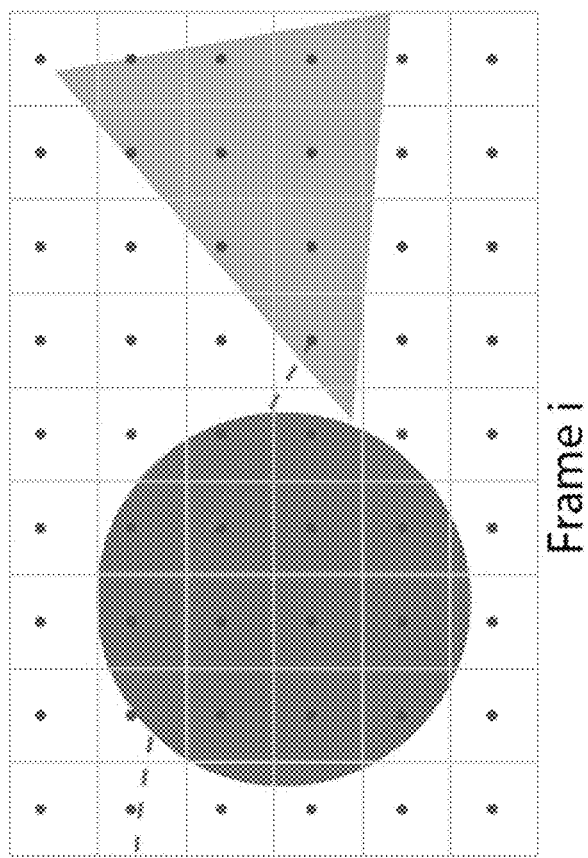
FIG. 2 illustrates an example subpixel backward motion vector rendered by game engines.
Figure 2:
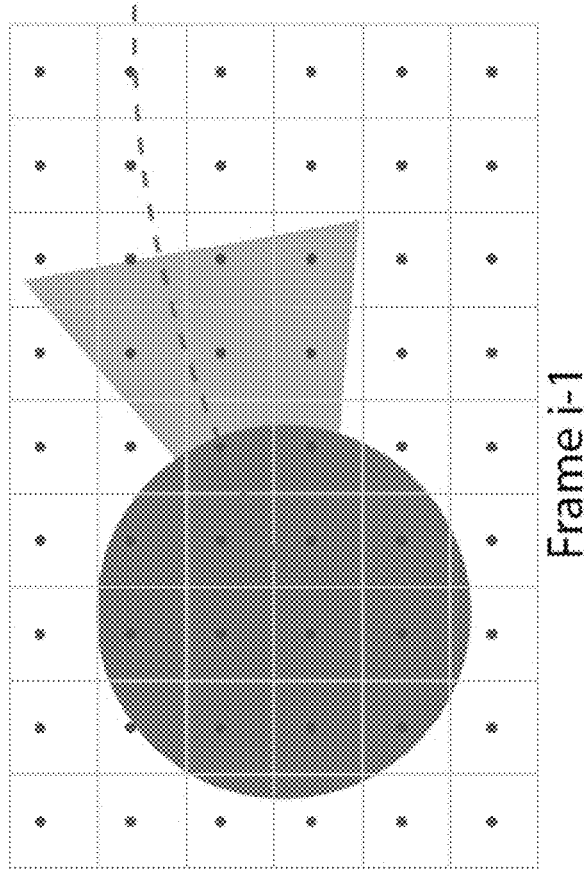

FIG. 2 illustrates an example subpixel backward motion vector rendered by game engines. In real-time rendering, each pixel may be a point sample of the underlying high-resolution image when multi-sample antialiasing is disabled, as illustrated in FIG. 2, where the dot at the center of each pixel represents the sample to render. In FIG. 2, the rendered point samples are represented by the black circle points at the center of each pixel. An example of the subpixel backward motion vector between frame i and i−1 is illustrated by the red dashed line. The motion vector defines where an infinitesimal 3D point that is visible at frame i would appear at its previous frame i−1, without its visibility or color information. Post-upsampling from such input is an antialiasing and interpolation problem, in contrast to a deblurring problem as in the camera image super-resolution applications.

Figure 3:
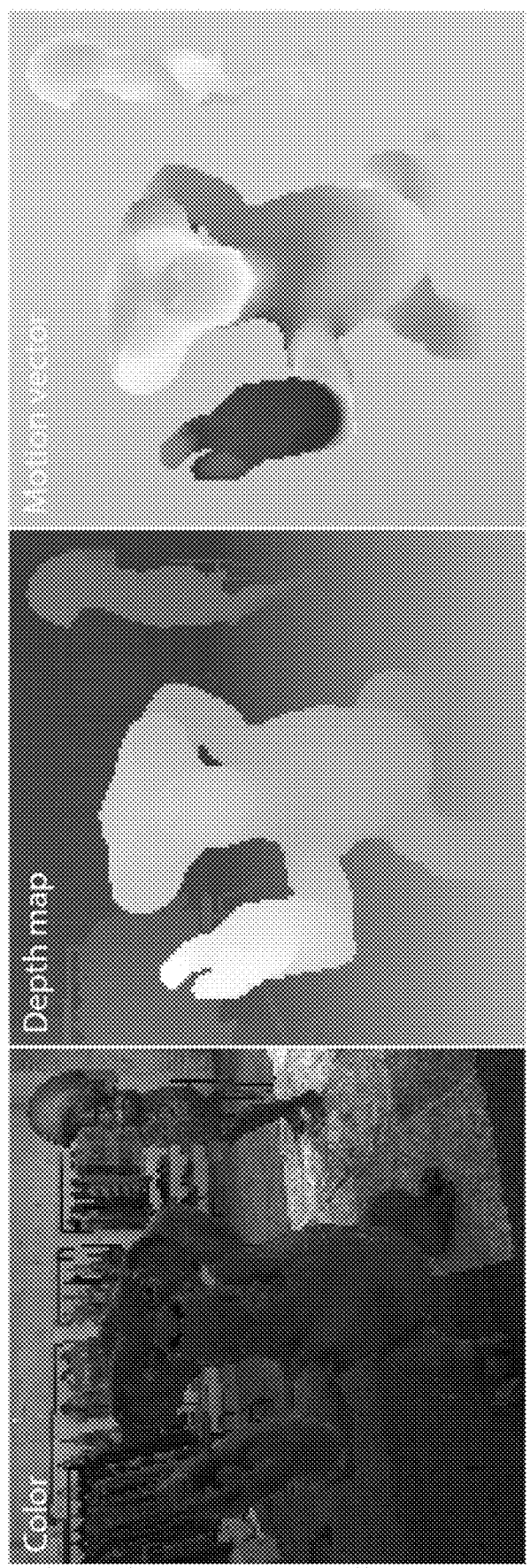
FIG. 3 illustrates example color, depth, and motion vectors rendered by game engines.

FIG. 3 illustrates example color, depth, and motion vectors rendered by game engines. The challenge of high-fidelity up-sampling for rendered content may include that the input images with point-sampled pixels may be extremely aliased at shading and geometry edges, and the information at the target to-be-interpolated pixels may be completely missing. To address this problem, the embodiments disclosed herein are motivated by the fact that in rendering, a more detailed information about the current and past frames and the way they are sampled may be known. To effectively leverage this information across multiple frames, the embodiments disclosed herein utilize the inputs commonly available in today's games engines, such as pixel color, depth map, and motion vectors, as visualized in FIG. 3.

In rendering, a motion vector points at an analytically computed screen-space location where a 3D point that is visible at the current frame may appear in the previous frame, with a subpixel precision, as shown in FIG. 2. While the rendered motion vector provides candidate matching between pixels for low cost, it may present a few limitations that prevent its direct use in multi-frame up-sampling. First, because it maps pixels backwards as illustrated in FIG. 2, pixels at a previous frame may not be directly projected to the current frame. Second, it may not consider dynamic disocclusion between the current and previous frame, i.e., 3D points visible at current frame may be occluded in the previous frames due to viewpoint change or object movement. An example case is illustrated in FIG. 2. Third, it may provide only a partial optical flow, i.e., only the motion of surface points and camera, and may not consider the change in lighting, shadows, view-dependent reflectance, etc. Consequently, the reconstruction method may need to robustly handle these limitations while taking advantage of the rendered motion vectors.

In particular embodiments, a computing system may first warp previous frames to align with the current frame, in order to reduce the required receptive field and complexity of the reconstruction network. In contrast to existing work, however, to better exploit the specifics of rendered data, i.e., point-sampled colors and subpixel-precise motion vectors, the computing system may apply the frame warping at the target (high) resolution space rather than at the input (low) resolution. In particular embodiments, up-sampling the first feature map and the one or more second feature maps to the target resolution may be based on zero up-sampling. Specifically, the computing system may project the input pixels to the high-resolution space, prior to the warping, by zero-upsampling.

As the rendered motion vectors do not reflect disocclusion or shading changes between frames, the warped previous frames may contain invalid pixels mismatching with the current frame, which may mislead the post-reconstruction. To address this problem, the embodiments disclosed herein include a reweighting mechanism before the reconstruction network to ideally de-select those invalid pixels. The reweighting mechanism may be related to the confidence map approaches used for multi-frame blending in various applications. In contrast to these methods, however, the computing system may utilize a neural network to learn the reweighting weights.

Lastly, the preprocessed previous frames (after zero-upsampling, warping and reweighting) may be stacked together with the current frame (after zero-upsampling), and fed into a reconstruction network for generating the desired high-resolution image.

Figure 4A:
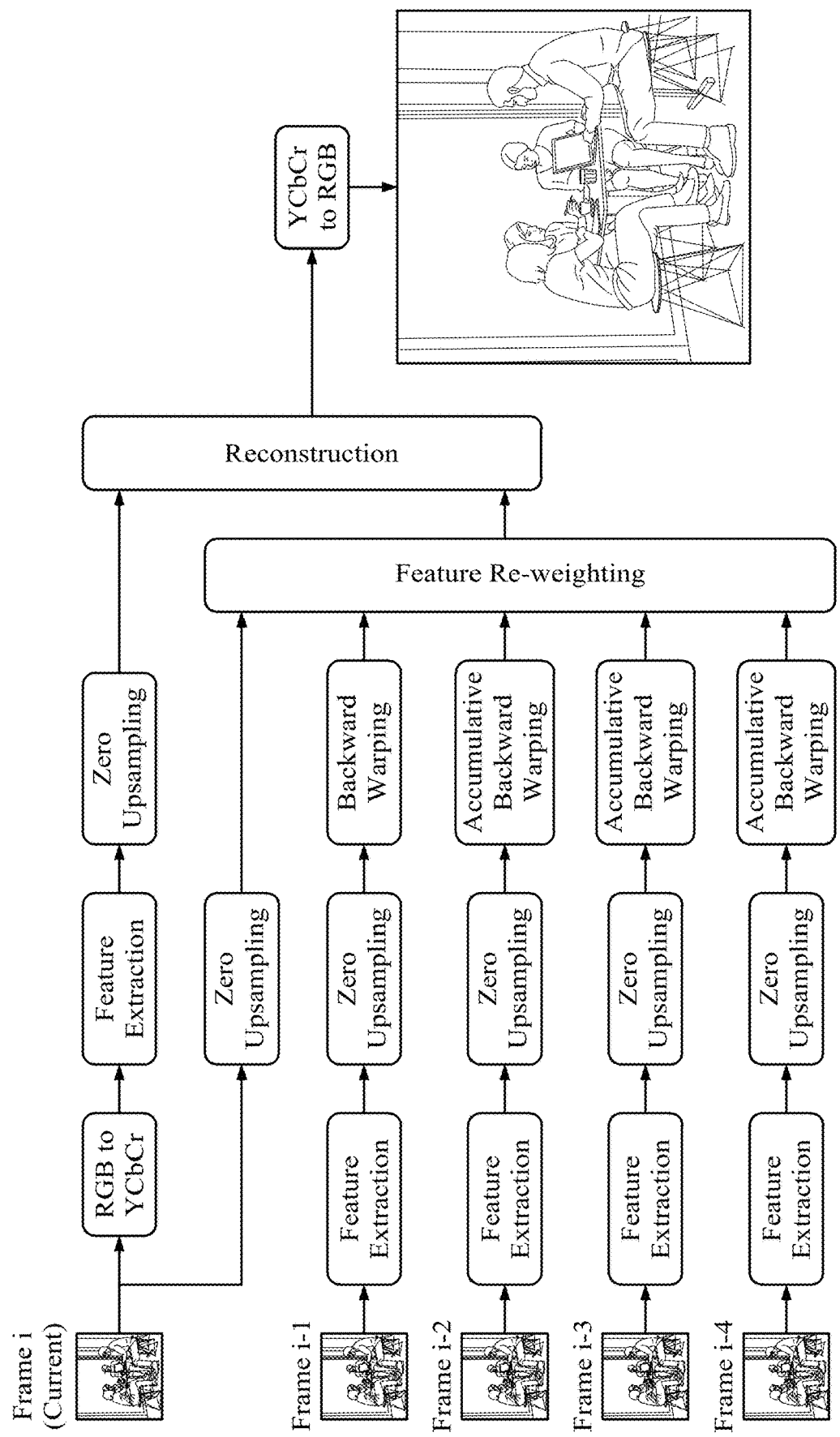
FIG. 4A illustrates an example network architecture of our method.
Figure 4B:
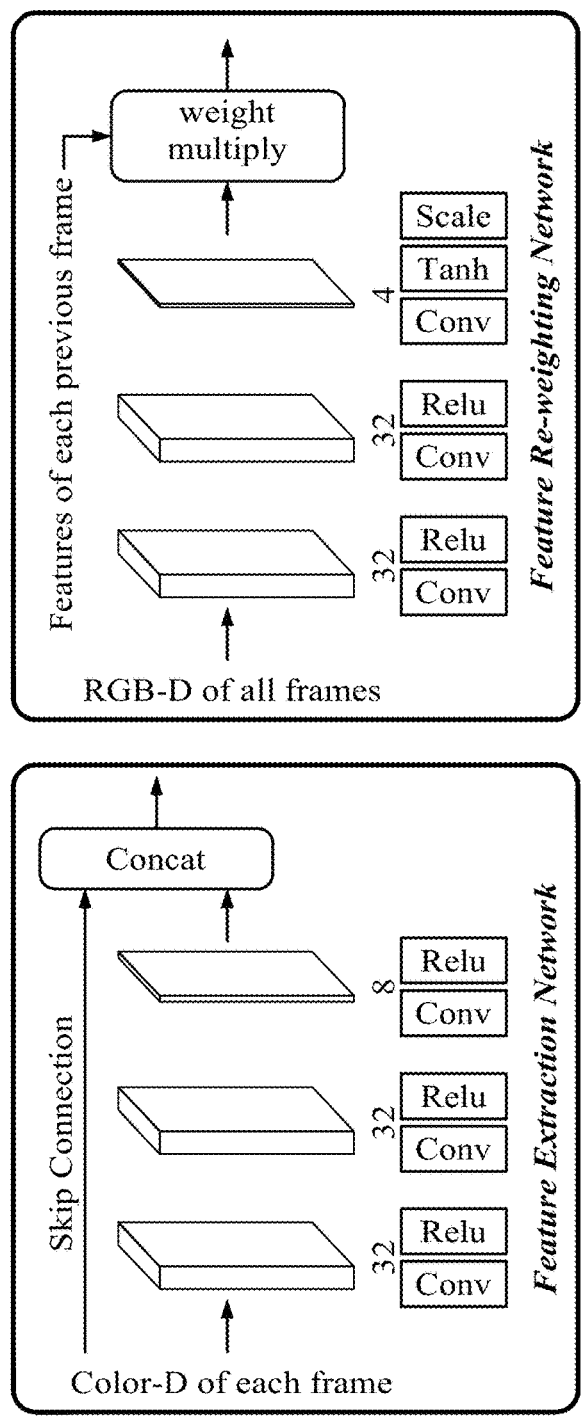
FIG. 4B illustrates example sub-networks of the example network architecture.

Feature Extraction. In particular embodiments, generating the first feature map for the first frame and the one or more second feature maps for the one or more second frames may be based on one or more convolutional neural networks. The feature extraction module may contain a 3-layer convolutional neural network. This subnetwork may process each input frame individually and share weights across all frames except for the current frame. In particular embodiments, generating each of the first feature map for the first frame and the one or more second feature maps for the one or more second frames may comprise learning an initial feature map for each of the first frame and the one or more second frames and combining the initial feature map, a corresponding input color, and a corresponding depth for each of the first frame and the one or more second frames to generate each of the first feature map and the one or more second feature maps. In particular embodiments, the initial feature map may be based on a first number of channels whereas each of the first feature map and the one or more second feature maps may be based on a second number of channels. As an example and not by way of limitation, for each frame, the subnetwork may take color and depth as input and generate 8-channel learned features, which are then concatenated with the input color and depth, resulting in 12-channel features in total. FIG. 4A illustrates an example network architecture of our method. FIG. 4B illustrates example sub-networks of the example network architecture. The sub-networks may include the feature extraction, feature reweighting, and reconstruction networks. The numbers under each network layer represent the output channels at corresponding layers. The filter size is 3×3 at all layers. The tanh layer in the feature reweighting network is followed by a scaling operation to map the values from (−1,1) to (0,10).

Temporal Reprojection. To reduce the required receptive field and thus complexity of the reconstruction network, the computing system may apply temporal reprojection to project pixel samples and learned features of each previous frame to the current, by using the rendered motion vectors. In order to fully exploit the subpixel backward motion vectors, the computing system may conduct the temporal reprojection at the target (high) resolution space. First, the computing system may project the pixel samples from input (low) resolution space to the high-resolution space, by zero up-sampling. The zero up-sampling may comprise assigning each input pixel of each of the first feature map and the one or more second feature maps to its corresponding pixel at the target resolution and setting all missing pixels around the input pixel as zeros. The location of each input pixel may fall equally in between s pixels in the high resolution, where s is the up-sampling ratio. Zero up-sampling may be chosen for its efficiency and because it provides the network information on which samples are valid or invalid.

Figure 5:
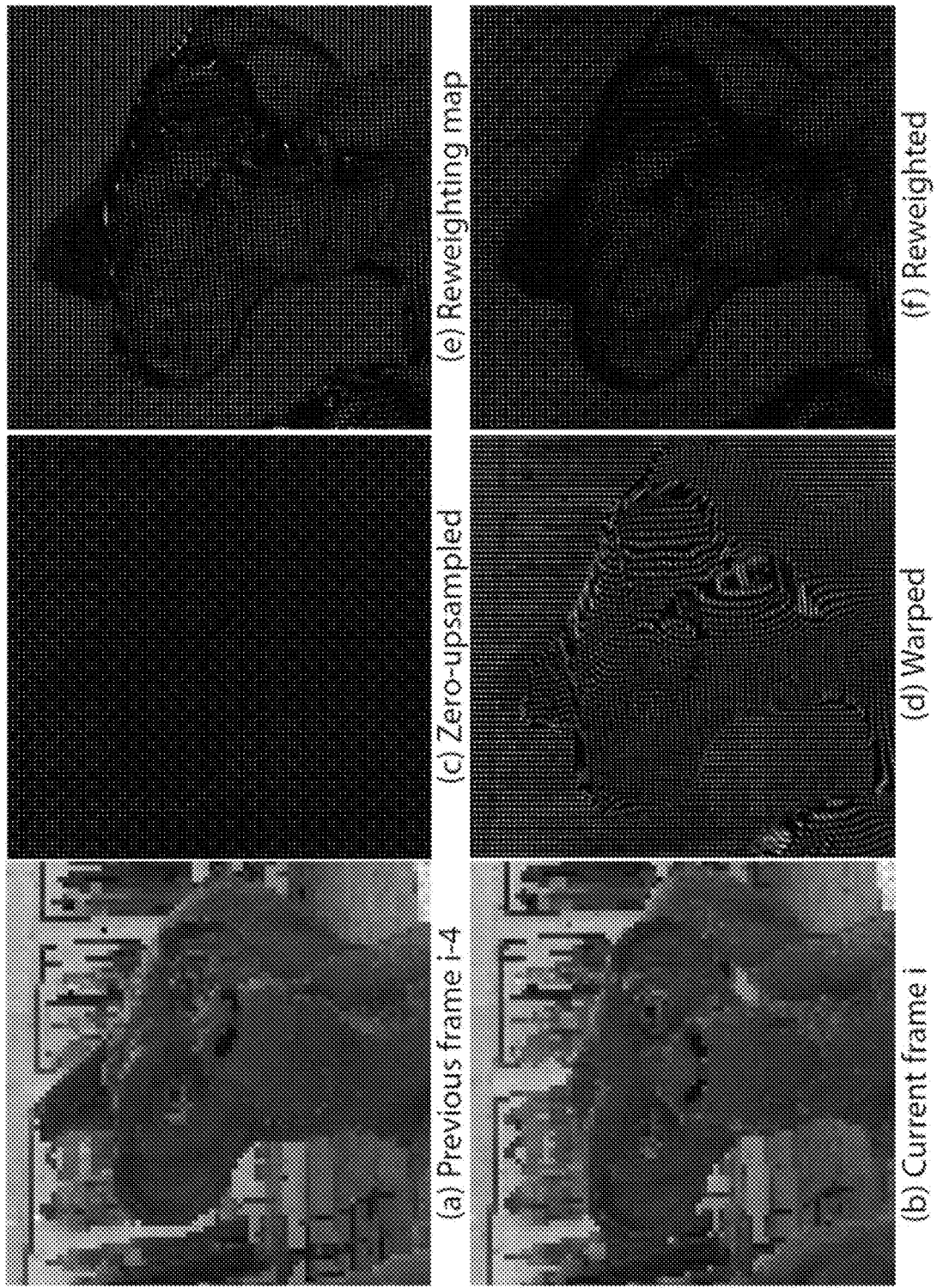
FIG. 5 illustrates example zero-upsampled and warped frames which are intermediate outputs of our method.

In particular embodiments, the computing system may determine the motion estimation between the associated second time and the first time. The determining may comprise identifying a motion vector for the corresponding second frame having the resolution lower than the target resolution and resizing the motion vector to the target resolution based on bilinear up-sampling. The computing system may resize the rendered low-resolution map of motion vectors to high resolution simply by bilinear up-sampling, taking advantage of the fact that the motion vectors are piece-wise smooth. While such simple up-sampling may introduce errors to the up-sampled map at discontinuous regions, it may well recover the majority of regions compared to ground truth. In particular embodiments, warping each of the one or more up-sampled second feature maps may comprise using the motion estimation with bilinear interpolation during warping. In other words, the computing system may apply backward warping of the zero-upsampled previous frames using the up-sampled motion vectors, while bilinear interpolation may be adopted during warping. FIG. 5 illustrates example zero-upsampled and warped frames which are intermediate outputs of our method. In subfigures (c)-(f) a single channel of the feature map in greyscale is visualized. The features of previous frame i−4 may be zero-upsampled (FIG. 5(c)) and warped to align with the current frame i, using the subpixel backward motion vectors (FIG. 5(d)). The warped features may go through the feature reweighting subnetwork (FIG. 5(e)), and the re-weighted features (FIG. 5(f)) may be then fed into the reconstruction subnetwork for final results. Note that the motion vectors may be only defined for an adjacent pair of frames. To warp across multiple previous frames, the computing system may apply the described warping process iteratively until each previous frame is warped to the current one. The embodiments disclosed herein use up to 4 previous frames in our experiments.

Performing warping at the zero-upsampled target resolution space may reduce the effect of low-pass interpolation during warping and thus protect the high-frequency information contained in the rendered point samples. This may make the embodiments disclosed herein distinct from existing super-resolution work that typically warps frames at the input low resolution space.

Feature Reweighting. The rendered motion vectors may not reflect dynamic disocclusions or shading changes between frames. Thus, the warped frames may contain artifacts such as ghosting at disocclusion regions and mismatched pixels at inconsistent shading regions.

To address this problem, the embodiments disclosed herein introduce a feature reweighting module to be able to mask out these mismatched samples. In particular embodiments, the computing system may input the up-sampled first feature map and the one or more up-sampled and warped second feature maps to a feature reweighting module. The feature reweighting module may be based on one or more convolutional neural networks. The computing system may generate, by the feature weighting module, a pixel-wise weighting map for each of the one or more up-sampled and warped second feature maps. The computing system may further multiply the pixel-wise weighting map with the corresponding up-sampled and warped second feature map to generate a reweighted feature map for the corresponding second frame. As an example and not by way of limitation, the feature reweighting module may be a 3-layer convolutional neural network, which may take the RGB-D of the zero-upsampled current frame as well as the zero-up-sampled, warped previous frames as input, and generate a pixel-wise weighting map for each previous frame, with values between 0 and 10, where 10 is a hyperparameter. The hyperparameter may be set to allow the learned map to not just attenuate, but also amplify the features per pixel, and empirically the embodiments disclosed herein found the dynamic range of 10 was enough.

Figure 4B:
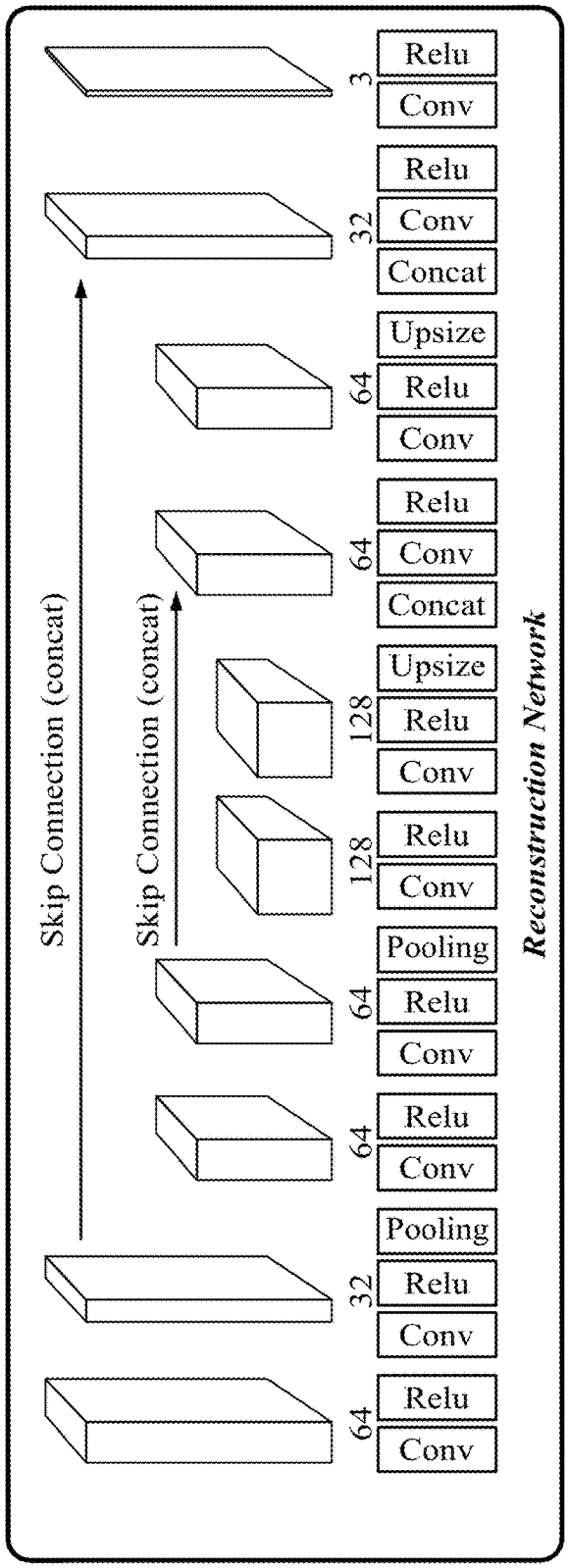

Then each weighting map may be multiplied to all features of the corresponding previous frame. The reason of feeding only RGB-D, instead of the whole 12-channel features, into the reweighting network may be to further reduce the network complexity. The network details are given in FIG. 4, and an example of a learned reweighting map is given in FIG. 5.

Reconstruction. In particular embodiments, generating the reconstructed frame corresponding to the first frame may comprise combining the up-sampled first feature map and the reweighted feature maps associated with the one or more second frames. Finally, the features of the current frame and the reweighted features of previous frames may be concatenated and fed into a reconstruction network, which may output the recovered high-resolution image of the current frame. In other words, the machine-learning model for generating the reconstructed frame corresponding to the first frame may be based on a convolutional neural network with one or more skip connections. The embodiments disclosed herein adopt a 3-scale, 10-layer U-Net with skip connections for the reconstruction subnetwork. The network details are given in FIG. 4.

Color Space. In particular embodiments, the first frame may comprise an RGB image. The computing system may optionally convert the input RGB image of first frame to a YCbCr image in the YCbCr color space, before feeding it to the neural network. The direct output of the network and the training loss may stay in YCbCr space, before the result is converted back to RGB space for viewing. While optional, the embodiments disclosed herein experimentally find the color space conversion slightly improves reconstruction quality, i.e. 0.1 dB improvement in peak signal-to-noise ratio (PSNR).

The training loss of our method, as given in Eq. (1), may be a weighted combination of the perceptual loss computed from a pretrained VGG-16 network and the structural similarity index (SSIM).

$$\text{loss}(x, \bar{x}) = 1 - SSIM(x, \bar{x}) + w \cdot \sum_{i=1}^{5} \|conv_i(x) - conv_i(\bar{x})\|_2^2 \quad (1)$$

where x and $\bar{x}$ are the network output and reference high-resolution image respectively, and the relative weight is w=0.1.

In particular embodiments, the computing system may need to render content from stereo images from AR/VR headsets. In this case, the computing system may additionally leverage the particular information provided by AR/VR headsets for reconstruction. As mentioned above, the computing system may use previous frames to provide additional information to help fill in the missing information of the up-sampled current frame. With AR/VR headsets, for each timestamp, the computing system may need to render a pair of stereo images, one for each eye of a user. The two stereo images may provide slightly different information about the same scene since they are rendered from different viewpoints. Such difference may be considered as additional information, which may be conceptually similar to the previous frames. As an example and not by way of limitation, the first frame may comprise a first stereo image captured by a first camera. Each of the one or more second frames may comprise a second stereo image captured by a second camera. For two stereo images, when up-sampling the first stereo image, the computing system may use the second stereo image to provide the additional information needed for filling in the missing information. Similar to the previous frames, the computing system may extract feature from the second stereo image and up-sample the feature and the RGB-D information as the second stereo image may be also generated at low resolution like the first stereo image. Then the computing system may perform warping. The warping may not be based on motion vectors. Instead, since the geometry of the rendered scene (e.g., the depth and location of objects) and the relative position between the first camera taking the first stereo image and the second camera taking the second stereo image are known, the computing system may warp the feature map of the second stereo image to the viewpoint of the first camera. In other words, warping each of the one or more up-sampled second feature maps may comprise warping the up-sampled second feature map of the second stereo image to a viewpoint of the first camera. The computing system may then perform feature reweighting based on the warped image of the second stereo image. After reweighting, the computing system may further perform reconstruction using similar process as aforementioned.

Another type of information to leverage may be head motion of the user wearing AR/VR headset. The computing system may generate motion vectors based on the head motion instead of using the motion vectors provided by game engines. In particular embodiments, the first frame and the one or more second frames may be received from a client device. The first frame and the one or more second frames may be associated with a head motion detected by the client device. Accordingly, the motion estimation may be determined based on the head motion.

In particular embodiments, the computing system may train a separate network for each 3D scene unless specified in the experiments. Large datasets may be necessary for training robust networks. The embodiments disclosed herein collected several representative, dynamic scenes in Unity and built a large-scale dataset generation program to render the training and test data. The program replays head motions that were captured from user studies in a VR headset, and renders color, depth and motion vectors of every frame.

Specifically, the computing system may render 100 videos from each scene, and each video contains 60 frames. Each video's camera starts from a random position in the scene and moves as defined in a pre-captured head motion path that is randomly selected for each video from a large candidate pool. For reference images, the computing system may first render the images at 4800×2700 with 8×MSAA and then downscale the images to 1600×900 with 3×3 box filters to further reduce aliasing. For low-resolution input images, the computing system may turn off MSAA and adjust mip level bias for texture sampling to match the selected mip level with the full resolution images. The mip level bias approach may be applied to reduce prefiltering in the rendered low-resolution images and may be similarly done in existing super-sampling algorithms such as TAAU.

During training, 80 videos are used to generate training batches, 10 for validation batches, and the remaining 10 are for testing. For training and validation, the computing system may divide the images into overlapped patches with resolution 256×256 pixels, while for testing the computing system may run the network on the full frames with 1600× 900 pixels. Our network may be fully convolutional, so it may be able to take any resolution as input.

The computing system may train our networks with TensorFlow. The network weights may be initialized following a conventional work. The ADAM method with default hyperparameters may be used for training optimization, with learning rate 1e-4, batch size 8, and 100 epochs of the data. Each network may take around 1.5 days to train on a Titan V GPU.

After training, the network models may be optimized with Nvidia TensorRT at 16-bit precision and tested on a Titan V GPU. In Table 1, the embodiments disclosed herein report the total runtime of our method for 4×4 super-sampling at varying target resolutions, including 720p (1280×720), Oculus Rift (1080×1200) and 1080p (1920×1080). In Table 2, the embodiments disclosed herein report the runtime breakdown of our method with 4×4 super-sampling at 1080p. The runtime is reported in unit of milliseconds (ms).

To study the trade-off between network complexity and reconstruction quality, in Tables 1, 2 and 3, the embodiments disclosed herein report two flavors of our method, i.e., the primary network, namely "Ours", and a lighter version, namely "Ours-Fast". The hyperparameters of the primary network are given in FIG. 3, and the only difference in the lighter network may be that the output channels of each layer except for the last one in the reconstruction U-Net are reduced by 50%. In Table 3, the embodiments disclosed herein compare the reconstruction quality of the two networks. The lighter network has minor decreased quality compared to the primary, however, both networks outperform existing methods by a large margin.

TABLE 1

Runtime (ms) of our 4 × 4 up-sampling for varying target resolutions, including 720p (1280 × 720), Oculus Rift (1080 × 1200) and 1080p (1920 × 1080).

|  | 128 × 720 | 1080 × 1200 | 1920 × 1080 |
|---|---|---|---|
| Ours | 11.96 | 15.99 | 24.42 |
| Ours-Fast | 8.84 | 11.87 | 18.25 |

TABLE 2

Runtime breakdown for 4 × 4 up-sampling for 1080p resolution. Corresponding time cost of the lighter network "Ours-Fast" is included in parentheses (the two networks are identical through Feature Reweighting).

| Module | Time (ms) |
|---|---|
| Feature extraction | 0.97 |
| Motion vector upsampling | 0.25 |
| Feature zero-upsampling | 0.28 |
| Warping | 0.90 |
| Feature reweighting | 4.73 |
| Reconstruction | Ours 17.2 (Ours-Fast 11.1) |
| Total | Ours 24.4 (Ours-Fast 18.3) |

TABLE 3

Quality comparisons of variants for our network. "Ours" and "Ours-Fast" represent the primary and lighter networks respectively, trained on each scene separately. "Ours-AllScenes" and "Ours-AllButOne" represent the primary networks trained on all scenes together, and on all scenes but the one tested, respectively.

|  |  | Ours-Fast | Ours | Ours-AllScenes | Ours-AllButOne |
|---|---|---|---|---|---|
| PSNR (dB) | Robots | 35.68 | 36.08 | 36.01 | 35.39 |
|  | Village | 30.36 | 30.70 | 30.75 | 30.18 |
|  | Dance Studio | 33.56 | 34.07 | 33.68 | 33.21 |
|  | Spaceship | 36.09 | 36.69 | 36.64 | 35.60 |
| SSIM | Robots | 0.9657 | 0.9696 | 0.9692 | 0.9626 |
|  | Village | 0.8892 | 0.9019 | 0.9002 | 0.8753 |
|  | Dance Studio | 0.9176 | 0.9224 | 0.9201 | 0.9104 |
|  | Spaceship | 0.9674 | 0.9712 | 0.9696 | 0.9647 |

TABLE 4

Quality comparisons with existing methods on all scenes. Results for each method averaged across 10 test videos in each scene. Our method outperforms all others by a large margin on every quality metric. Note that different than PSNR and SSIM, lower values in STRRED mean higher quality results.

|  |  | ESPCN | VESPCN | DUF | EDSR | RCAN | Ours |
|---|---|---|---|---|---|---|---|
| PSNR (dB) | Robots | 31.72 | 31.72 | 32.30 | 33.72 | 33.40 | 36.08 |
|  | Village | 27.26 | 27.39 | 27.62 | 27.74 | 27.77 | 30.70 |

TABLE 4-continued

Quality comparisons with existing methods on all scenes. Results for each method averaged across 10 test videos in each scene. Our method outperforms all others by a large margin on every quality metric. Note that different than PSNR and SSIM, lower values in STRRED mean higher quality results.

| | | ESPCN | VESPCN | DUF | EDSR | RCAN | Ours |
|---|---|---|---|---|---|---|---|
| | DanceStudio | 30.24 | 30.41 | 30.96 | 30.96 | 31.62 | 24.07 |
| | Spaceship | 32.73 | 32.80 | 33.65 | 33.65 | 34.39 | 36.69 |
| SSIM | Robots | 0.9134 | 0.9142 | 0.9335 | 0.9335 | 0.9440 | 0.9696 |
| | Village | 0.7908 | 0.7950 | 0.8270 | 0.8270 | 0.8294 | 0.9019 |
| | DanceStudio | 0.8375 | 0.8418 | 0.8640 | 0.8640 | 0.8777 | 0.9224 |
| | Spaceship | 0.9119 | 0.9123 | 0.9286 | 0.9286 | 0.9418 | 0.9712 |
| STRRED | Robots | 109.7 | 103.5 | 73.2 | 56.5 | 63.6 | 19.3 |
| | Village | 192.4 | 186.6 | 131.8 | 169.8 | 168.6 | 42.5 |
| | DanceStudio | 213.0 | 194.8 | 118.8 | 117.8 | 121.6 | 40.6 |
| | Spaceship | 98.8 | 96.6 | 66.6 | 58.1 | 58.4 | 22.1 |

The embodiments disclosed herein compare our method to several state-of-the-art super-resolution work, including single image super-resolution methods ESPCN, EDSR and RCAN, and video super-resolution methods VESPCN and DUF. The embodiments disclosed herein re-implemented and trained all the methods on the same datasets as in our method with the same training procedure. For the video super-resolution methods, the embodiments disclosed herein adjusted their networks to take only current and previous frames as input, avoiding any future frames. The number of input previous frames used in video super-resolution methods is also increased to 4 to match our method.

The embodiments disclosed herein evaluate the results with three quality metrics: peak signalto-noise ratio (PSNR), structural similarity index (SSIM), and spatio-temporal entropic difference (STRRED). PSNR and SSIM are well-known for single image assessment, the higher the better. STRRED is widely used for video quality assessment that includes temporal stability, the lower the better. The embodiments disclosed herein evaluate the results on four representative scenes, namely Robots, Village, DanceStudio and Spaceship. In Table 4, the embodiments disclosed herein compare the above quality metrics, averaged over 10 test videos from our dataset.

Figure 6:
FIG. 6 illustrates an example comparison with Unreal TAAU with 4×4 super-sampling.
Figure 7:
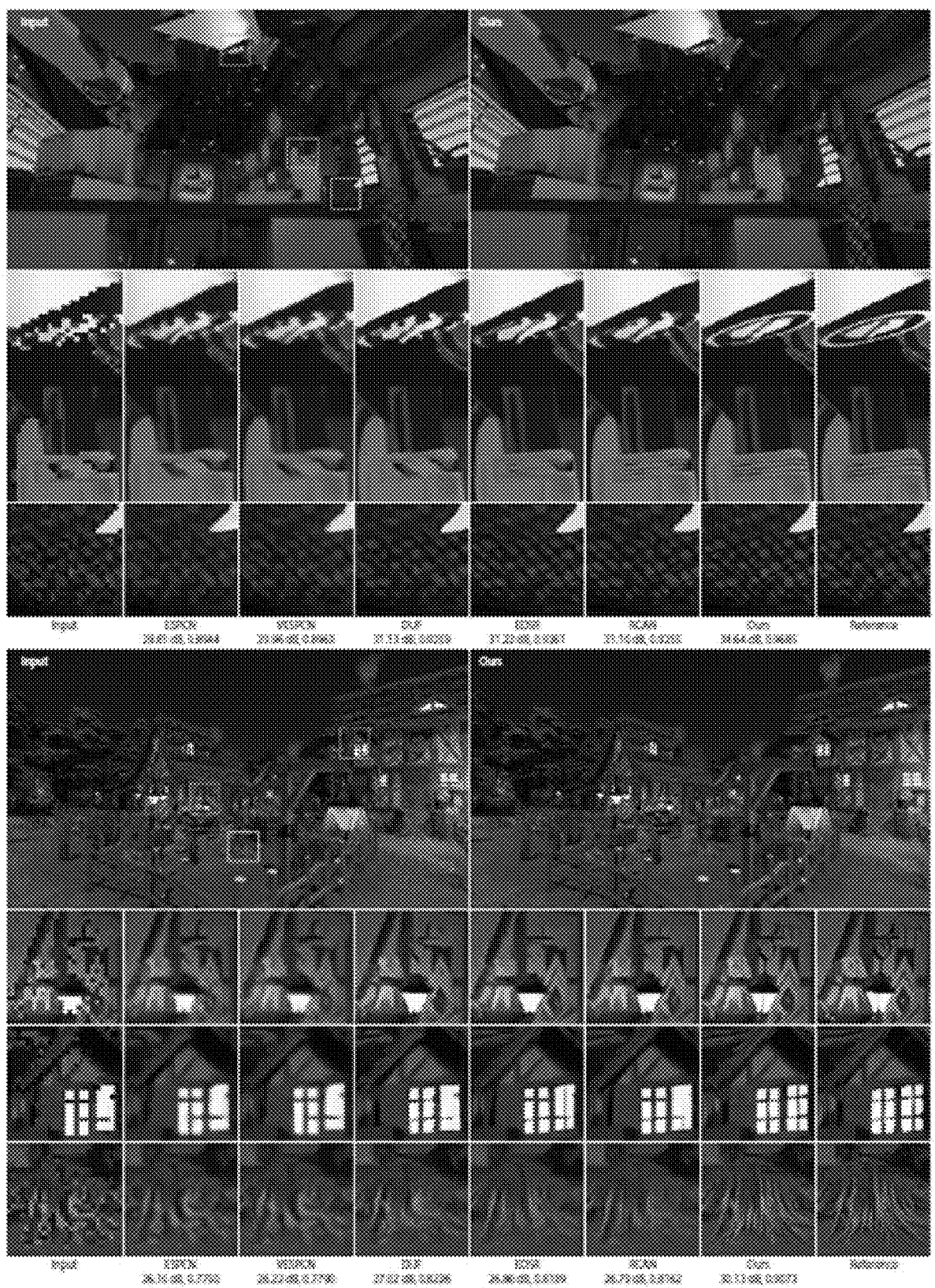
FIG. 7 illustrates example visual results on the Robots (top) and Village (bottom) scene.
Figure 8:
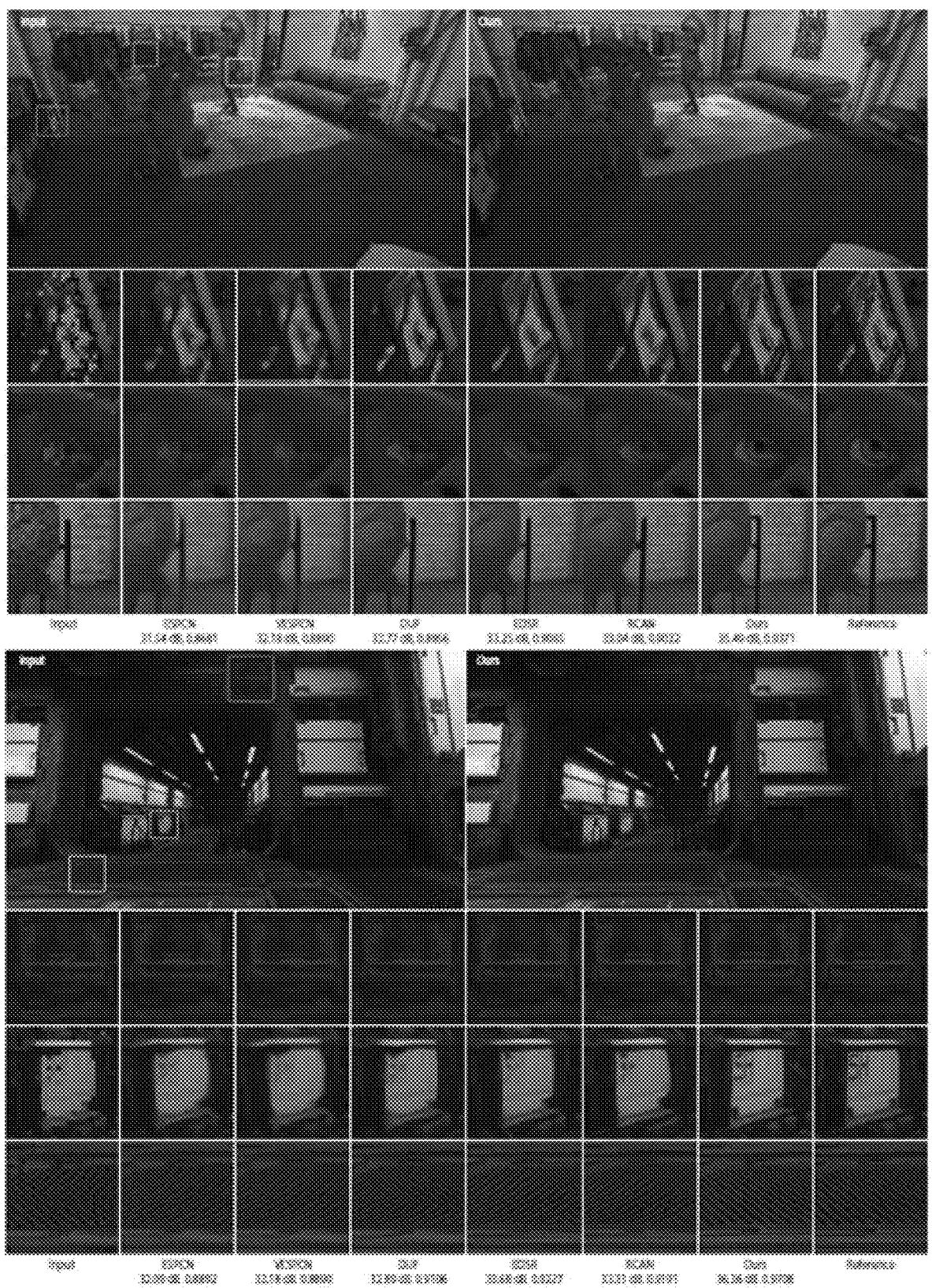
FIG. 8 illustrates example visual results on the DanceStudio (top) and Spaceship (bottom) scene.

In addition, the embodiments disclosed herein compare to the temporal antialiasing upscaling (TAAU) method from Unreal Engine (i.e., a real-time 3D creation platform). The computing system took the Robots scene as an example, and converted it to Unreal to collect the TAAU results. FIG. 6 illustrates an example comparison with Unreal TAAU with 4×4 super-sampling. As the scene in Unity and Unreal cannot be matched exactly, the embodiments disclosed herein first provide visual comparisons in FIG. 6, showing that our method produces significantly better visual quality. Furthermore, the embodiments disclosed herein evaluate the PSNR and SSIM of ours and TAAU with respect to each own's reference image rendered at Unity and Unreal respectively. Our result (PSNR=31.74 dB, SSIM=0.9430) significantly outperforms TAAU (PSNR=30.06 dB, SSIM=0.9070). FIG. 7 illustrates example visual results on the Robots (top) and Village (bottom) scene. FIG. 8 illustrates example visual results on the DanceStudio (top) and Spaceship (bottom) scene. In FIG. 7 and FIG. 8, the embodiments disclosed herein compare result images both visually and quantitatively. Our method outperforms all other methods on all scenes by a large margin.

Rendering Efficiency. The embodiments disclosed herein take the Spaceship scene as a representative scenario to demonstrate how the end-to-end rendering efficiency may be improved by applying our method. The computing system renders on a Nvidia Titan RTX GPU using the expensive and high-quality ray-traced global illumination effect available in Unity. The render pass for a full resolution image may take 140.6 ms at 1600×900. On the other hand, rendering the image at 400×225 takes 26.40 ms, followed by our method, which may take 17.68 ms (the primary network) to up-sample the image to the target 1600×900 resolution, totaling to 44.08 ms. This leads to an over 3× rendering performance improvement, while providing high-fidelity results.

Generalization. While the embodiments disclosed herein choose to train a network for each scene to maximize its quality, an open question may be how it generalizes across scenes. In Table 3, the embodiments disclosed herein report the quality of our primary network trained jointly on all four scenes ("Ours-AllScenes") and trained on all scenes but the one tested ("Ours-AllButOne"), respectively, and compare them to the primary network trained on each scene separately ("Ours"). The test quality reduces slightly with Ours-AllScenes (0.05-0.4 dB in PSNR) and more with Ours-AllButOne (0.5-1 dB in PSNR). However, both networks still noticeably outperform all comparison methods that are trained on each scene separately. This indicates that the network may generalize across scenes with different appearance although including the test scenes into training datasets seems to always improve the quality. However, a full evaluation of network generalization may require collecting more scenes.

Figure 9:
FIG. 9 illustrates an example visual comparison to the network variant using a single (current) frame as input.

Previous Frames. In Table 5, the embodiments disclosed herein report the reconstruction quality by using a varying number of previous frames. The quality increases as more previous frames are used. However, the network runtime likewise increases. Of note is that runtime may be dominated by the reconstruction sub-network (Table 2). Only the first layer of this part may be affected by the number of frames, so adding more previous frames only slightly may increase runtime. Thus, applications may vary this parameter to get to a sweet spot in quality/runtime trade-off. FIG. 9 illustrates an example visual comparison to the network variant using a single (current) frame as input. "Ours-SingleFrame" represents the trained network that takes only a single frame as input. The experiment demonstrates the quality gained from the use of previous frames.

Super-sampling Ratios. In Table 6, the embodiments disclosed herein report the reconstruction quality of our method with varying super-sampling ratios from 2×2 to 6×6. In this experiment, the embodiments disclosed herein keep the target resolution the same and vary the input image resolution according to the super-sampling ratio. As expected, the reconstruction quality gracefully improves as the super-sampling ratio reduces. Additionally, to verify the performance advantage of our method at varying super-sampling ratios, the embodiments disclosed herein train all existing methods with 2×2 up-sampling and report the results in Table 7. Our method significantly outperforms the existing work.

TABLE 5

Quality and runtime (for 1080p target resolution) versus number of previous frames used as inputs on the Robots scene.

| # Previous frames | 0 | 1 | 2 | 3 | 4 |
|---|---|---|---|---|---|
| PSNR (dB) | 32.66 | 34.00 | 34.92 | 35.61 | 36.08 |
| SSIM | 0.9340 | 0.9505 | 0.9596 | 0.9653 | 0.9696 |
| Runtime (ms) | 16.46 | 21.36 | 23.19 | 23.71 | 24.42 |

TABLE 6

Reconstruction quality versus super-sampling ratio on Robots scene.

| Super-sampling ratio | 6 × 6 | 5 × 5 | 4 × 4 | 3 × 3 | 2 × 2 |
|---|---|---|---|---|---|
| PSNR (dB) | 32.97 | 34.36 | 36.08 | 38.17 | 41.19 |
| SSIM | 0.9392 | 0.9538 | 0.9696 | 0.9820 | 0.9928 |

TABLE 7

Quantitative comparisons for 2 × 2 up-sampling on Robots scene.

| | ESPCN | VESPCN | DUF | EDSR | RCAN | Ours |
|---|---|---|---|---|---|---|
| PSNR (dB) | 36.21 | 36.39 | 37.12 | 38.10 | 37.99 | 41.19 |
| SSIM | 0.9692 | 0.9694 | 0.9772 | 0.9881 | 0.9807 | 0.9928 |

TABLE 8

Ablation experiment for quality gain from the additional depth and motion vector inputs. VESPCN+, which is modified from VESPCN, takes the same depth and motion vector inputs as ours. PSNR and SSIM are reported.

| | VESPCN | VESPCN+ | Ours |
|---|---|---|---|
| Robots | 31.72 dB/0.9142 | 33.03 dB/0.9250 | 36.08 dB/0.9696 |
| Village | 27.39 dB/0.7950 | 28.55 dB/0.8222 | 30.70 dB/0.9019 |
| Dance Studio | 30.41 dB/0.8418 | 31.48 dB/0.8584 | 34.07 dB/0.9224 |
| Spaceship | 32.80 dB/0.9123 | 33.91 dB/0.9251 | 36.69 dB/0.9712 |

TABLE 9

Ablation experiment for temporal reprojection. The network is trained with each of the following upsampling and warping settings, and results on the Robots scene are reported.

| | PSNR (dB) | SSIM |
|---|---|---|
| Warp at low-res, then bilinear up-sampling | 34.97 | 0.9570 |
| Warp at low-res, then zero-upsampling | 35.08 | 0.9570 |
| Bilinear up-sampling, then warp at high-res | 35.82 | 0.9658 |
| Zero-upsampling, then warp at high-res (Ours) | 36.08 | 0.9696 |

TABLE 10

Ablation experiment for the feature extraction and feature reweighting modules. The network is trained with each (and both) of these submodules removed, and results on the Robots scene are reported.

| Feature Extraction | Feature Reweighting | PSNR (dB) | SSIM |
|---|---|---|---|
| x | x | 35.63 | 0.9652 |
| x | ✓ | 35.76 | 0.9670 |
| ✓ | x | 35.90 | 0.9678 |
| ✓ | ✓ | 36.08 | 0.9696 |

Quality Gain from Additional Inputs. While our method outperforms all compared methods by a large margin, we would like to understand the quality gain from its additional depth and motion vector inputs. The embodiments disclosed herein revise the VESPCN method to take the same depth and motion vector input as ours, namely "VESPCN+", where the motion vectors replace the optical flow estimation module in the original VESPCN and the depth is fed as an additional channel together with the RGB color input. As reported in Table 8, with the additional inputs, VESPCN+ improves moderately (1.1-1.3 dB in PSNR) upon VESPCN, however it is still noticeably worse (2.2-3.1 dB in PSNR) than our method. This indicates that both the additional inputs and the specifically tailored network design of our method may play important roles in our performance achievement.

Zero-Upsampling and Warping. Our method may project input pixels to the target (high) resolution space by zero-upsampling, and then warp the up-sampled previous frames to the current frame for post-processing. To understand its impact on the reconstruction quality, the embodiments disclosed herein experiment with alternative ways for temporal reprojection, i.e., replacing zero-upsampling with bilinear up-sampling and/or warping at the input (low) resolution space instead, and the results are reported in Table 9. We observe about 1 dB improvement in PSNR by warping at the target resolution compared to at the input resolution, and about 0.3 dB additional improvement by using zero-upsampling compared to bilinear up-sampling. This may indicate the benefit of our approach tailored for effectively leveraging the rendering-specific inputs, i.e., point-sampled color and subpixel-precise motion vectors.

Figure 10:
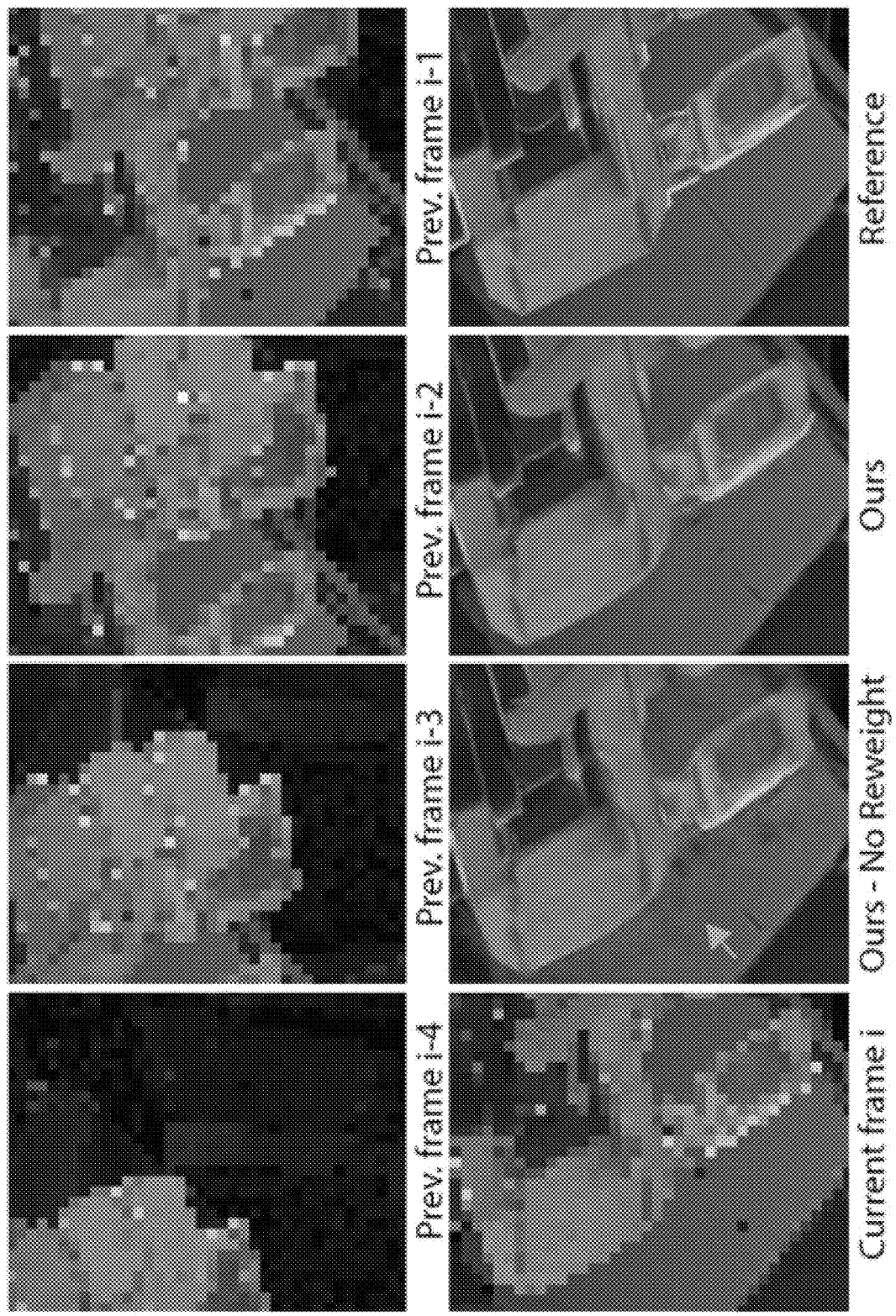
FIG. 10 illustrates an example ablation experiment for the feature reweighting module.

Network Modules. In Table 10, the embodiments disclosed herein report the ablation experiments for analyzing the quality improvements from the feature extraction and feature reweighting modules. Average results are reported on the 10 test videos of the Robots scene. While the numeric results show only minor improvements from the reweighting module, the results are averaged over large amounts of data, and the regions affected by disocclusion and mismatched pixels (the parts of images most impacted by this module) only make up a relatively small part of the images. FIG. 10 illustrates an example ablation experiment for the feature reweighting module. In FIG. 10, a visual comparison is provided to demonstrate the contribution of the feature reweighting module. When the network is trained without the reweighting module, ghosting artifacts appear at the dis-occluded regions as pointed by the arrow. When the network is trained without the reweighting module, ghosting artifacts appear at the disocclusion regions around the robot's fingers.

Figure 11:
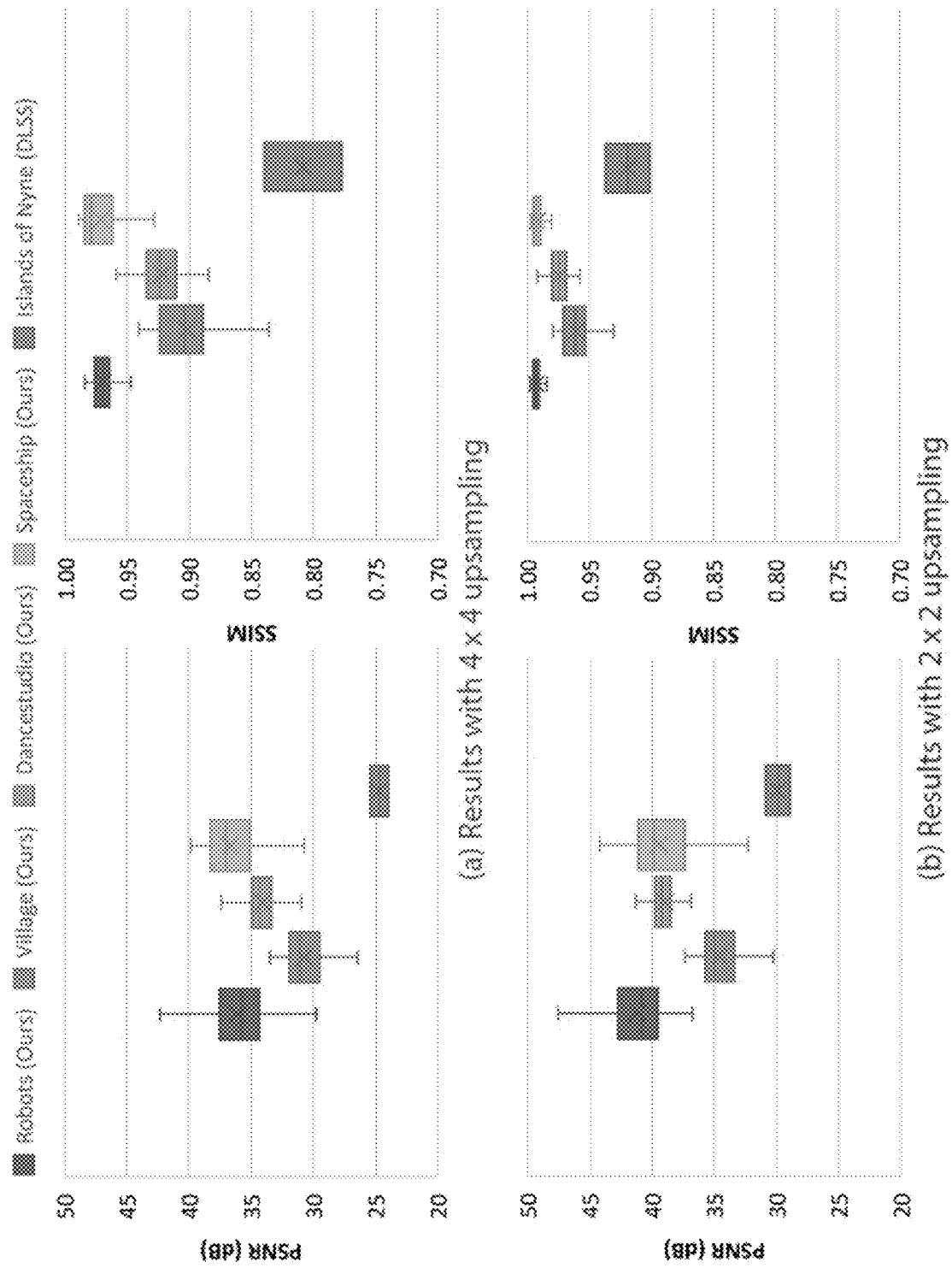
FIG. 11 illustrates example results indicating DLSS quality.

Discussion with DLSS. While DLSS (i.e., a conventional work) also aims for learned super-sampling of rendered content, no public information is available on the details of its algorithm, performance or training datasets, which may make direct comparisons impossible. Instead, the embodiments disclosed herein provide a preliminary ballpark analysis of its quality performance with respect to our method, however, on different types of scenes. Specifically, the embodiments disclosed herein took the game "Islands of Nyne" supporting DLSS as an example, and captured two pairs of representative screenshots, where each pair of screenshots include the DLSS-upsampled image and the full-resolution image with no up-sampling, both at 4K resolution. The content is chosen to be similar to our Spaceship and Robots scene in terms of geometric and materials complexity, with metallic (glossy) boxes and walls and some thin structures (railings, geometric floor tiles). The computing system computed the PSNR and SSIM of the up-sampled images after masking out mismatched pixels due to dynamic objects, plot the numerical quality as a distribution, and add our result's quality to the same chart. FIG. 11 illustrates example results indicating DLSS quality. Our results were computed on the test dataset from our Unity scenes (600 test frames per scene), reported as a box and whisker chart in FIG. 11. The content for DLSS and for our method is different, and we were able to capture only a few pixel accurate image pairs, so a direct comparison is not possible. This plot is meant to illustrate that the quality ballparks for both methods are comparable. Box and whisker chart of the quality for (a) 4×4 up-sampling and (b) 2×2 up-sampling, by our method and DLSS on different scenes. While it is not a direct comparison (and generally it may be impossible to compare the methods on the same scene), we believe this experiment may suggest that the quality ballparks of our method and DLSS are comparable.

Figure 12:
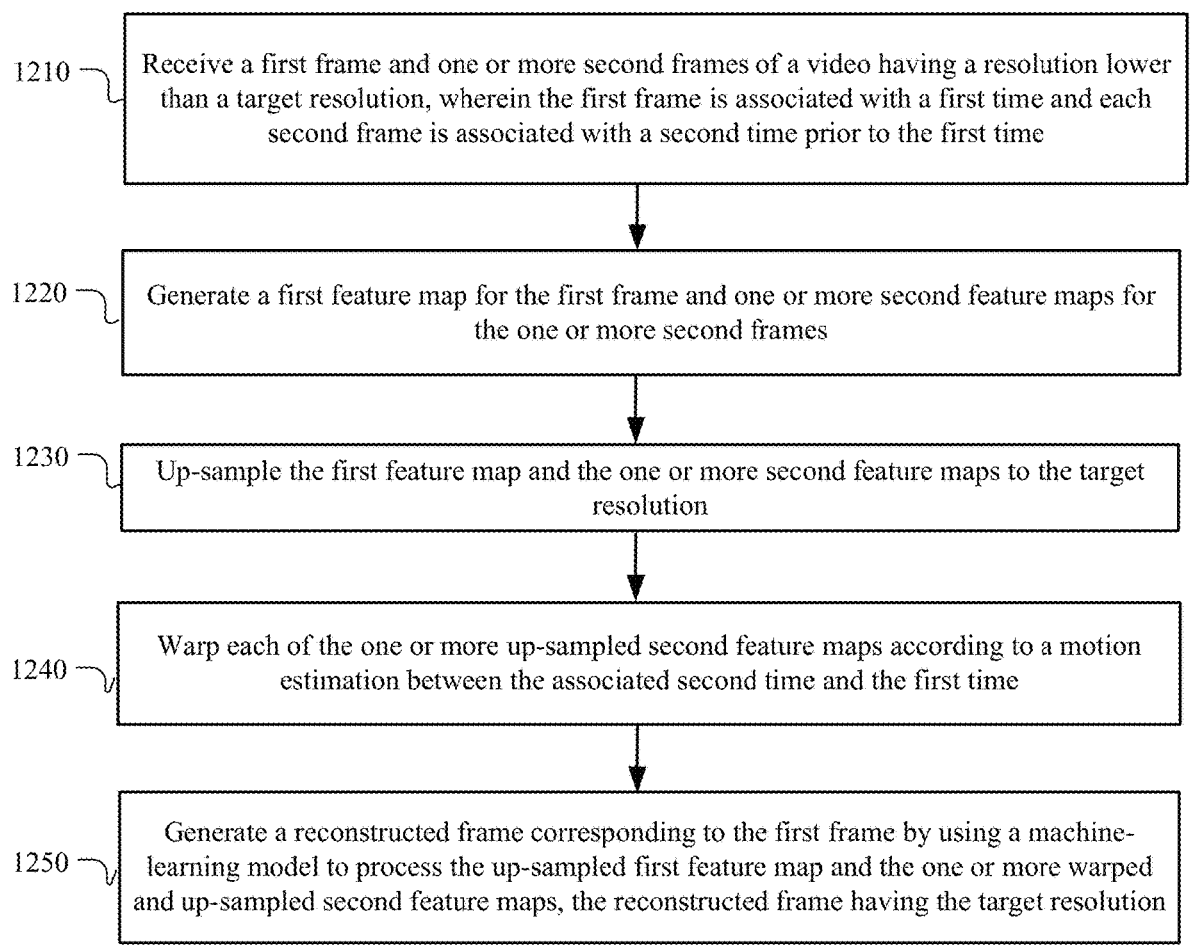
FIG. 12 illustrates an example method for up-sampling rendered content.

FIG. 12 illustrates an example method 1200 for up-sampling rendered content. The method may begin at step 1210, where the computing system may receive a first frame and one or more second frames of a video having a resolution lower than a target resolution, wherein the first frame is associated with a first time and each second frame is associated with a second time prior to the first time. At step 1220, the computing system may generate a first feature map for the first frame and one or more second feature maps for the one or more second frames. At step 1230, the computing system may up-sample the first feature map and the one or more second feature maps to the target resolution. At step 1240, the computing system may warp each of the one or more up-sampled second feature maps according to a motion estimation between the associated second time and the first time. At step 1250, the computing system may generate a reconstructed frame corresponding to the first frame by using a machine-learning model to process the up-sampled first feature map and the one or more up-sampled and warped second feature maps, the reconstructed frame having the target resolution. Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for up-sampling rendered content including the particular steps of the method of FIG. 12, this disclosure contemplates any suitable method for up-sampling rendered content including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Embodiments of the invention may include or be implemented in conjunction with an artificial reality system. Artificial reality is a form of reality that has been adjusted in some manner before presentation to a user, which may include, e.g., a virtual reality (VR), an augmented-reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 13:
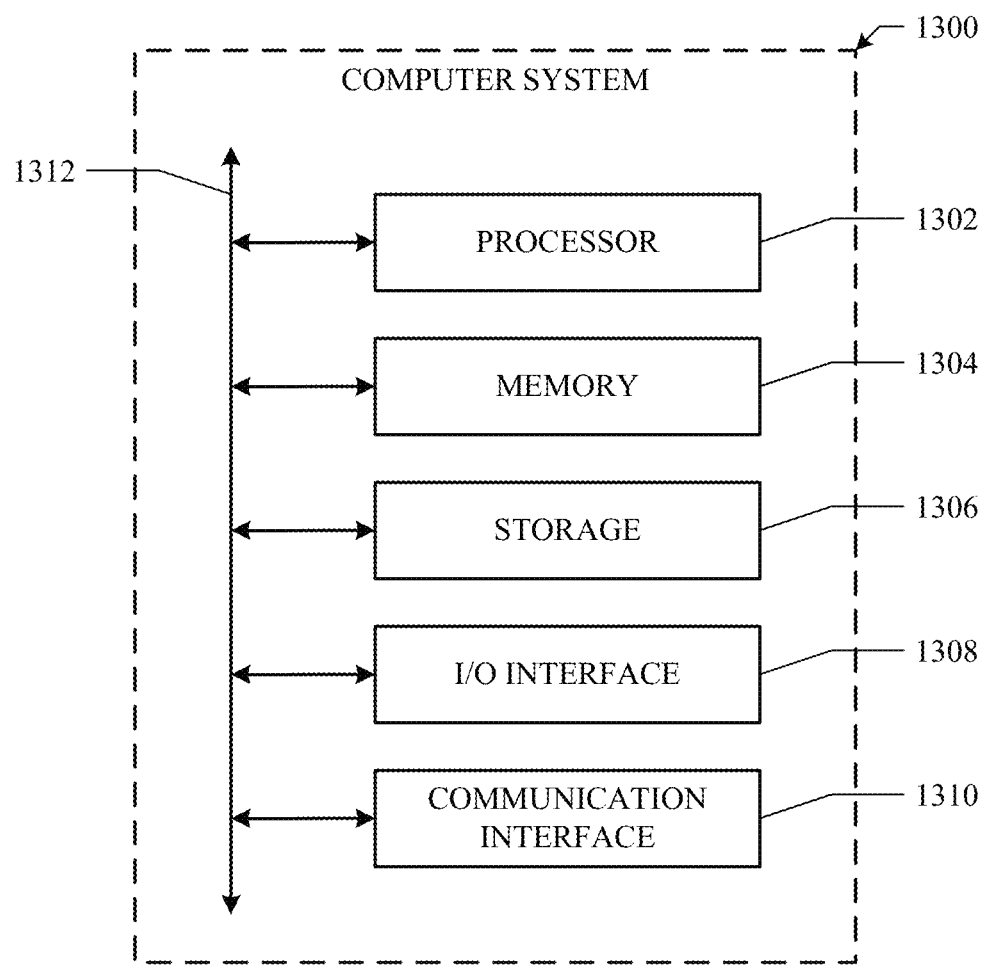
FIG. 13 illustrates an example computer system.

FIG. 13 illustrates an example computer system 1300. In particular embodiments, one or more computer systems 1300 perform one or more steps of one or more methods described or illustrated herein. In particular embodiments, one or more computer systems 1300 provide functionality described or illustrated herein. In particular embodiments, software running on one or more computer systems 1300 performs one or more steps of one or more methods described or illustrated herein or provides functionality described or illustrated herein. Particular embodiments include one or more portions of one or more computer systems 1300. Herein, reference to a computer system may encompass a computing device, and vice versa, where appropriate. Moreover, reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302. Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may include one or more memories 1304, where appropriate. Although this disclosure describes and illustrates particular memory, this disclosure contemplates any suitable memory.

In particular embodiments, storage 1306 includes mass storage for data or instructions. As an example and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1310 for it. As an example and not by way of limitation, computer system 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1300 may include any suitable communication interface 1310 for any of these networks, where appropriate. Communication interface 1310 may include one or more communication interfaces 1310, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
   receiving a first frame and one or more second frames of a video having a resolution lower than a target resolution, wherein the first frame is associated with a first time and each second frame is associated with a second time prior to the first time;
   generating an initial first feature map for the first frame and one or more initial second feature maps for the one or more second frames, respectively, based on one or more channels associated with each of the first frame and the one or more second frames;
   generating a first feature map for the first frame and one or more second feature maps for the one or more second frames, respectively, based on combining the one or more channels associated with the first frame with the initial first feature map and combining the one or more channels associated with each of the one or more second frames with each of the one or more initial second feature maps, respectively;
   up-sampling the first feature map and the one or more second feature maps to the target resolution;
   warping each of the one or more up-sampled second feature maps according to a motion estimation between the associated second time and the first time; and
   generating a reconstructed frame corresponding to the first frame by using a machine-learning model to process the up-sampled first feature map and the one or more up-sampled and warped second feature maps, the reconstructed frame having the target resolution.

2. The method of claim 1, wherein the first frame comprises an RGB image.

3. The method of claim 2, further comprising:
converting the RGB image to a YCbCr image.

4. The method of claim 1, wherein generating the first feature map for the first frame and the one or more second feature maps for the one or more second frames, respectively, is based on one or more convolutional neural networks.

5. The method of claim 1,
wherein each of the initial first feature map and the one or more initial second feature maps is based on a first number of channels, and wherein each of the first feature map and the one or more second feature maps is based on a second number of channels.

6. The method of claim 1, wherein up-sampling the first feature map and the one or more second feature maps to the target resolution is based on zero up-sampling, wherein the zero up-sampling comprises:
assigning each input pixel of each of the first feature map and the one or more second feature maps to its corresponding pixel at the target resolution; and
setting all missing pixels around the input pixel as zeros.

7. The method of claim 1, further comprising determining the motion estimation between the associated second time and the first time, wherein the determining comprises:
identifying a motion vector for the corresponding second frame having the resolution lower than the target resolution; and
resizing the motion vector to the target resolution based on bilinear up-sampling.

8. The method of claim 1, wherein warping each of the one or more up-sampled second feature maps comprises using the motion estimation with bilinear interpolation during warping.

9. The method of claim 1, further comprising:
inputting the up-sampled first feature map and the one or more up-sampled and warped second feature maps to a feature reweighting module, wherein the feature reweighting module is based on one or more convolutional neural networks.

10. The method of claim 9, further comprising:
generating, by the feature weighting module, a pixel-wise weighting map for each of the one or more up-sampled and warped second feature maps; and
multiplying the pixel-wise weighting map with the corresponding up-sampled and warped second feature map to generate a reweighted feature map for the corresponding second frame.

11. The method of claim 10, wherein generating the reconstructed frame corresponding to the first frame comprises:
combining the up-sampled first feature map and the reweighted feature maps associated with the one or more second frames.

12. The method of claim 1, wherein the machine-learning model is based on a convolutional neural network with one or more skip connections.

13. The method of claim 1, wherein the first frame and the one or more second frames are received from a client device, wherein the first frame and the one or more second frames are associated with a head motion detected by the client device, and wherein the motion estimation is determined based on the head motion.

14. The method of claim 1, wherein the first frame comprises a first stereo image captured by a first camera, wherein each of the one or more second frames comprises a second stereo image captured by a second camera.

15. The method of claim 14, wherein warping each of the one or more up-sampled second feature maps comprises:
warping the up-sampled second feature map of the second stereo image to a viewpoint of the first camera.

16. One or more computer-readable non-transitory storage media embodying software that is operable when executed to:
receive a first frame and one or more second frames of a video having a resolution lower than a target resolution, wherein the first frame is associated with a first time and each second frame is associated with a second time prior to the first time;
generate an initial first feature map for the first frame and one or more initial second feature maps for the one or more second frames, respectively, based on one or more channels associated with each of the first frame and the one or more second frames;
generate a first feature map for the first frame and one or more second feature maps for the one or more second frames, respectively, based on combining the one or more channels associated with the first frame with the initial first feature map and combining the one or more channels associated with each of the one or more second frames with each of the one or more initial second feature maps, respectively;
up-sample the first feature map and the one or more second feature maps to the target resolution;
warp each of the one or more up-sampled second feature maps according to a motion estimation between the associated second time and the first time; and
generate a reconstructed frame corresponding to the first frame by using a machine-learning model to process the up-sampled first feature map and the one or more up-sampled and warped second feature maps, the reconstructed frame having the target resolution.

17. The media of claim 16,
wherein each of the initial first feature map and the one or more initial second feature maps is based on a first number of channels, and wherein each of the first feature map and the one or more second feature maps is based on a second number of channels.

18. The media of claim 16, wherein up-sampling the first feature map and the one or more second feature maps to the target resolution is based on zero up-sampling, wherein the zero up-sampling comprises:
assigning each input pixel of each of the first feature map and the one or more second feature maps to its corresponding pixel at the target resolution; and
setting all missing pixels around the input pixel as zeros.

19. A system comprising: one or more processors; and a non-transitory memory coupled to the processors comprising instructions executable by the processors, the processors operable when executing the instructions to:
receive a first frame and one or more second frames of a video having a resolution lower than a target resolution, wherein the first frame is associated with a first time and each second frame is associated with a second time prior to the first time;
generate an initial first feature map for the first frame and one or more initial second feature maps for the one or more second frames, respectively, based on one or more channels associated with each of the first frame and the one or more second frames;
generate a first feature map for the first frame and one or more second feature maps for the one or more second frames, respectively, based on combining the one or more channels associated with the first frame with the initial first feature map and combining the one or more channels associated with each of the one or more second frames with each of the one or more initial second feature maps, respectively;

up-sample the first feature map and the one or more second feature maps to the target resolution;

warp each of the one or more up-sampled second feature maps according to a motion estimation between the associated second time and the first time; and generate a reconstructed frame corresponding to the first frame by using a machine-learning model to process the up-sampled first feature map and the one or more up-sampled and warped second feature maps, the reconstructed frame having the target resolution.

20. The system of claim 19, wherein each of the initial first feature map and the one or more initial second feature maps is based on a first number of channels, and wherein each of the first feature map and the one or more second feature maps is based on a second number of channels.

\* \* \* \* \*